(12) United States Patent
Ishii et al.

(10) Patent No.: US 11,379,239 B2
(45) Date of Patent: Jul. 5, 2022

(54) APPARATUS AND METHOD FOR MAKING PREDICTIONS FOR INSTRUCTION FLOW CHANGING INSTRUCTIONS

(71) Applicant: Arm Limited, Cambridge (GB)

(72) Inventors: Yasuo Ishii, Austin, TX (US); Muhammad Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 168 days.

(21) Appl. No.: 16/364,557

(22) Filed: Mar. 26, 2019

(65) Prior Publication Data

US 2020/0310811 A1 Oct. 1, 2020

(51) Int. Cl.
*G06F 15/00* (2006.01)
*G06F 9/30* (2018.01)
(Continued)

(52) U.S. Cl.
CPC ........ *G06F 9/3806* (2013.01); *G06F 9/30058* (2013.01); *G06F 9/32* (2013.01)

(58) Field of Classification Search
CPC ....... G06F 9/3806; G06F 9/32; G06F 9/30058
(Continued)

(56) References Cited

U.S. PATENT DOCUMENTS 6,263,427 B1 * 7/2001 Cummins ............ G06F 9/3806
712/236
2001/0004747 A1 6/2001 Koehler
(Continued)

OTHER PUBLICATIONS

Notice of Allowance dated Sep. 24, 2020 for U.S. Appl. No. 16/364,570, 10 pages.
U.S. Appl. No. 16/364,570, filed Mar. 26, 2019, Ishii et al.

*Primary Examiner* — Chun Kuan Lee
(74) *Attorney, Agent, or Firm* — Nixon & Vanderhye P.C.

(57) ABSTRACT

An apparatus and method are provided for making predictions for instruction flow changing instructions. The apparatus has a fetch queue that identifies a sequence of instructions to be fetched for execution by execution circuitry, and prediction circuitry for making predictions in respect of instruction flow changing instructions, and for controlling which instructions are identified in the fetch queue in dependence on the predictions. The prediction circuitry has a target prediction storage used to identify target addresses for instruction flow changing instructions that are predicted as taken. The target prediction storage comprises at least one entry that is configurable as a multi-taken entry to indicate that a source instruction flow changing instruction identified by that entry is a first instruction flow changing instruction with an associated first target address that identifies a series of instructions that is expected to exhibit static behaviour and that terminates with a second instruction flow changing instruction, where the second instruction flow changing instruction is unconditionally taken and has an associated second target address. The prediction circuitry is arranged, when making a prediction for a chosen instruction flow changing instruction that is identified by a multi-taken entry in the target prediction storage, to identify with reference to target address information stored in that multi-taken entry both the series of instructions and a target instruction at the second target address. It then causes the series of instructions and the target instruction to be identified in the fetch queue, and begins making further predictions starting from the target instruction at the second target address.

27 Claims, 19 Drawing Sheets

(51) Int. Cl.
*G06F 9/38* (2018.01)
*G06F 9/32* (2018.01)

(58) Field of Classification Search
USPC .......................................................... 712/207
See application file for complete search history.

(56) References Cited

U.S. PATENT DOCUMENTS

| | | | |
|---|---|---|---|
| 2004/0268103 A1* | 12/2004 | Shelor | G06F 9/3861 |
| | | | 712/244 |
| 2006/0095745 A1 | 5/2006 | Tran | |
| 2013/0339695 A1 | 12/2013 | Bonanno | |
| 2019/0369999 A1 | 12/2019 | Evers | |
| 2020/0004543 A1 | 1/2020 | Kumar | |
| 2020/0167163 A1* | 5/2020 | Levenstein | G06F 9/3818 |

* cited by examiner

GENERAL TWO-TAKEN ENTRY

| V | TWO-TAKEN ENTRY | FIRST BRANCH TYPE | SECOND BRANCH TYPE | LENGTH OF Y | WAY PREDICTION INFO | Xn | INDICATION OF Y0 | INDICATION OF Z0 |
|---|---|---|---|---|---|---|---|---|

FLAGS ──┐ ... ──┘  SOURCE ADDRESS  TARGET ADDRESS INFO

↗ 230 can also indicate if conditional — optional

FIG. 4B

TWO-TAKEN ENTRY WHERE SECOND BRANCH IS A RETURN

| V | TWO-TAKEN ENTRY | FIRST BRANCH TYPE | SECOND BRANCH IS RETURN | LENGTH OF Y | ... | Xn | Y0 |
|---|---|---|---|---|---|---|---|

↗ 240

INDICATES TO GET SECOND TARGET ADDRESS FROM RETURN STACK

FIG. 4C

| V | TWO-TAKEN ENTRY | FIRST BRANCH IS CALL | SECOND BRANCH IS RETURN | LENGTH OF Y | WAY PREDICTION INFO | Xn | Y0 |
|---|---|---|---|---|---|---|---|

↗ 250

IMPLICIT THAT SECOND TARGET ADDRESS IS NEXT SEQUENTIAL ADDRESS AFTER Xn, I.E. STATIC

CAN INCLUDE AS SECOND TARGET IS STATIC

FIG. 4D

| Entry Type | Branch Source | Branch Target | |
|---|---|---|---|
| V | 1taken | A | B |
| V | 2taken | X | Y | Z |

Main BTB array

500

510 → (1taken row)
520 → (2taken row)

Two branch targets are pushed into one target space. To realize that, 2-taken target has one assumption. (Upper bits of target address is same with X)

FIG. 9

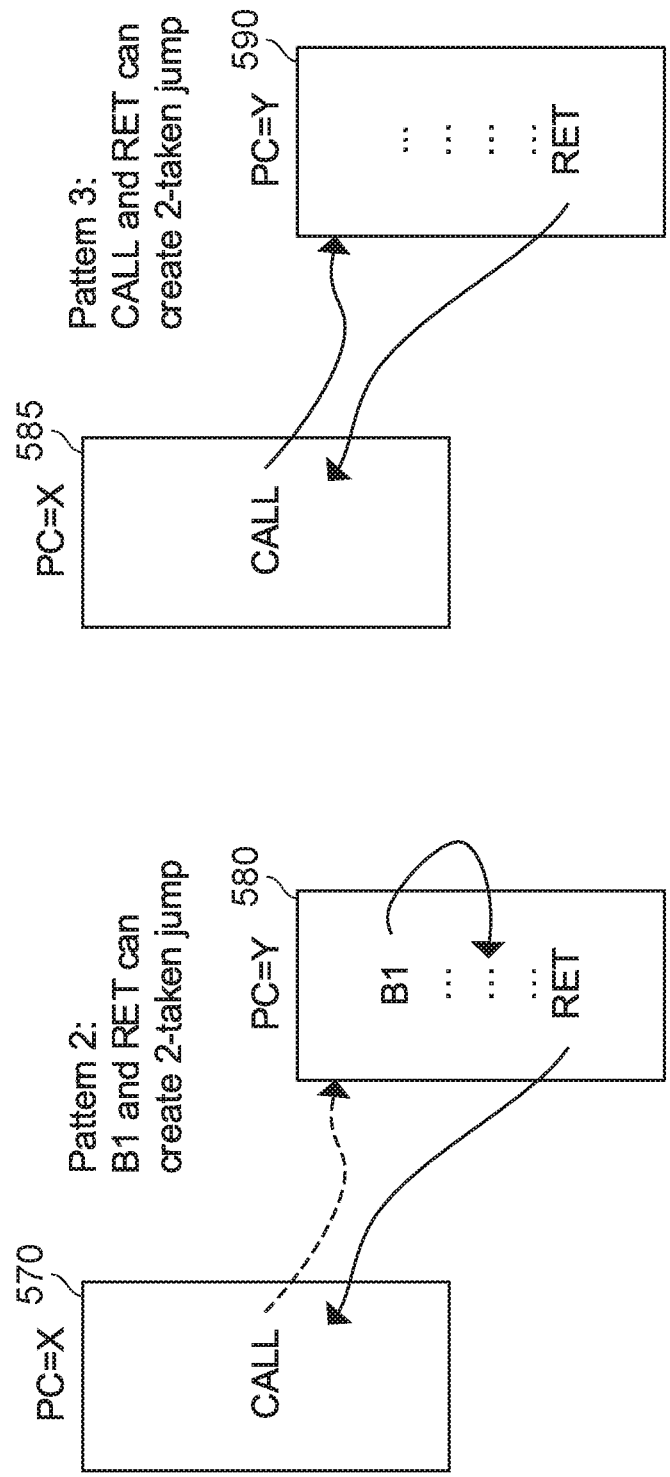

APPARATUS AND METHOD FOR MAKING PREDICTIONS FOR INSTRUCTION FLOW CHANGING INSTRUCTIONS

BACKGROUND

The present technique relates to an apparatus and method for making predictions for instruction flow changing instructions.

Within a data processing apparatus, execution circuitry may be provided for executing instructions. A fetch queue may be provided to identify instructions to be fetched from memory for execution by the execution circuitry.

Typically, instructions from sequential addresses in memory will be executed until an instruction flow changing instruction is encountered. In particular, execution of such an instruction flow changing instruction may cause a discontiguous change in the address, such that the next instruction executed after the instruction flow changing instruction is at a target address determined for the instruction flow changing instruction, rather than the immediately following instruction within the instruction address space. In order to seek to ensure that the fetch queue identifies the instructions that actually require execution by the execution circuitry, it is known to provide prediction circuitry to make predictions in respect of such instruction flow changing instructions, for example to identify whether those instructions will be taken or not taken, and, if those instructions are taken, to predict the target address of the next instruction to be executed. The predictions made by the prediction circuitry can then be used to control which instructions are identified in the fetch queue.

It would be desirable to improve the throughput of the prediction circuitry, as that throughput limits how quickly indications of instructions to be fetched can be added to the fetch queue. However, it is important to ensure that any increase in the throughput of the prediction circuitry does not adversely impact the accuracy of the predictions made, as inaccurate predictions will impact the overall performance of the data processing apparatus.

SUMMARY

In one example arrangement, there is provided an apparatus comprising: a fetch queue to identify a sequence of instructions to be fetched for execution by execution circuitry; and prediction circuitry to make predictions in respect of instruction flow changing instructions, and to control which instructions are identified in the fetch queue in dependence on the predictions; wherein: the prediction circuitry includes a target prediction storage having a plurality of entries that are used to identify target addresses for instruction flow changing instructions that are predicted as taken; the target prediction storage comprises at least one entry that is configurable as a multi-taken entry to indicate that a source instruction flow changing instruction identified by that entry is a first instruction flow changing instruction with an associated first target address that identifies a series of instructions that is expected to exhibit static behaviour and that terminates with a second instruction flow changing instruction, where the second instruction flow changing instruction is unconditionally taken and has an associated second target address; and the prediction circuitry is arranged, when making a prediction for a chosen instruction flow changing instruction that is identified by a multi-taken entry in the target prediction storage, to identify with reference to target address information stored in that multi-taken entry both the series of instructions and a target instruction at the second target address, to cause the series of instructions and the target instruction to be identified in the fetch queue and to begin making further predictions starting from the target instruction at the second target address.

In another example arrangement, there is provided a method of making predictions for instruction flow changing instructions, comprising: identifying within a fetch queue a sequence of instructions to be fetched for execution by execution circuitry; making predictions in respect of instruction flow changing instructions, and controlling which instructions are identified in the fetch queue in dependence on the predictions; identifying, within entries of target prediction storage, target addresses for instruction flow changing instructions that are predicted as taken; configuring at least one entry in the target prediction storage as a multi-taken entry to indicate that a source instruction flow changing instruction identified by that entry is a first instruction flow changing instruction with an associated first target address that identifies a series of instructions that is expected to exhibit static behaviour and that terminates with a second instruction flow changing instruction, where the second instruction flow changing instruction is unconditionally taken and has an associated second target address; and when making a prediction for a chosen instruction flow changing instruction that is identified by a multi-taken entry in the target prediction storage, identifying with reference to target address information stored in that multi-taken entry both the series of instructions and a target instruction at the second target address, causing the series of instructions and the target instruction to be identified in the fetch queue, and beginning making further predictions starting from the target instruction at the second target address.

In a still further example arrangement, there is provided an apparatus comprising: fetch queue means for identifying a sequence of instructions to be fetched for execution by execution circuitry; and prediction means for making predictions in respect of instruction flow changing instructions, and for controlling which instructions are identified in the fetch queue means in dependence on the predictions; wherein: the prediction means includes a target prediction storage means having a plurality of entries for identifying target addresses for instruction flow changing instructions that are predicted as taken; the target prediction storage means comprises at least one entry that is configurable as a multi-taken entry to indicate that a source instruction flow changing instruction identified by that entry is a first instruction flow changing instruction with an associated first target address that identifies a series of instructions that is expected to exhibit static behaviour and that terminates with a second instruction flow changing instruction, where the second instruction flow changing instruction is unconditionally taken and has an associated second target address; and the prediction means, when making a prediction for a chosen instruction flow changing instruction that is identified by a multi-taken entry in the target prediction storage means, for identifying with reference to target address information stored in that multi-taken entry both the series of instructions and a target instruction at the second target address, for causing the series of instructions and the target instruction to be identified in the fetch queue means and for beginning making further predictions starting from the target instruction at the second target address.

BRIEF DESCRIPTION OF THE DRAWINGS

The present technique will be described further, by way of illustration only, with reference to examples thereof as illustrated in the accompanying drawings, in which:

FIGS. 4A to 4D schematically illustrate the information captured in association with two-taken entries in accordance with example implementations;

FIG. 9 illustrates the format of a two-taken entry within the main branch target buffer, in accordance with one example arrangement;

FIGS. 11A and 11B illustrate two patterns of instruction flow associated with function call and associated function return instructions, for which two-taken entries can be utilised;

DESCRIPTION OF EXAMPLES

Figure 1:
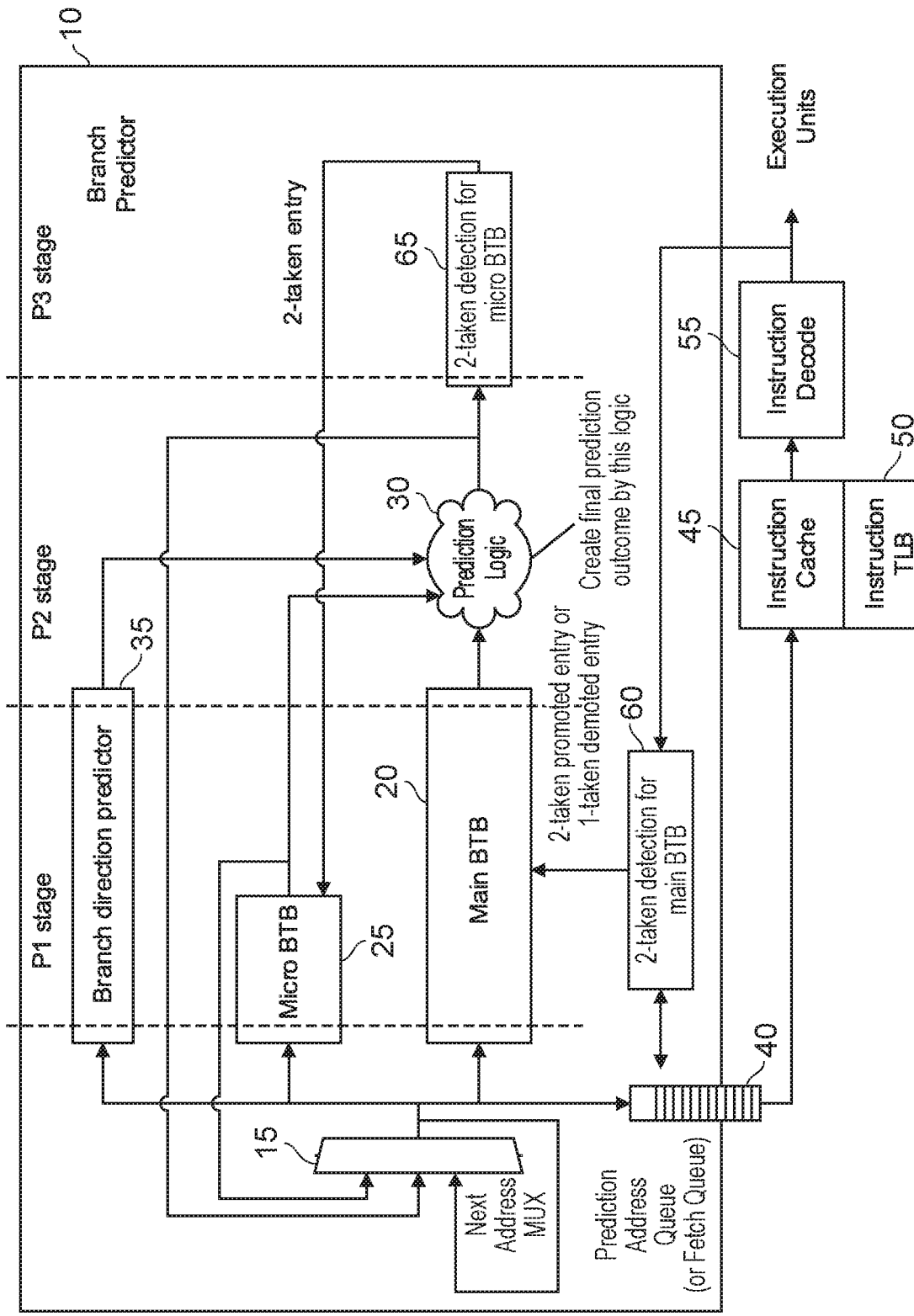
FIG. 1 is a block diagram of an apparatus in accordance with one example implementation.

In typical systems, an iteration of prediction by prediction circuitry involves the following process:
1. Detect whether an instruction flow changing instruction is predicted at a given instruction address, PC (program counter)=X;
2. Predict the direction for the instruction flow changing instruction (i.e. taken or not taken) if an instruction flow changing instruction has been predicted for the instruction address PC=X;
3. Predict the target address, PC=Y, if the predicted instruction flow changing instruction is predicted as taken;
4. Update the program counter value to Y if it is predicted that the instruction flow changing instruction is taken, and if not update the program counter value to the next sequential address (e.g. X+4 in scenarios where each instruction occupies four bytes within the instruction address space).

Typically, prediction circuitry can consider a predict block of instructions in one iteration, the predict block comprising a plurality of sequential instructions within the memory address space, for example the instructions at addresses PC=X, X+4, X+8, X+12, . . . ). However, the prediction circuitry cannot typically process an instruction flow changing instruction and its target instruction in the same iteration.

It would be desirable to improve the bandwidth of the prediction circuitry, so as to increase the rate at which instructions can be identified within the fetch queue. However, as mentioned earlier it is desirable that any increase in prediction bandwidth is not offset by a reduction in prediction accuracy. As will be discussed in more detail later herein, the present technique provides a mechanism which allows the prediction bandwidth to be increased without compromising prediction accuracy.

In one example arrangement, an apparatus is provided that has a fetch queue to identify a sequence of instructions to be fetched for execution by execution circuitry. There are a number of ways in which the instructions can be identified within the fetch queue, but in one example arrangement the instructions in the fetch queue are identified by specifying address information for those instructions, with that address information then being used in order to fetch the associated instructions from memory.

The apparatus also has prediction circuitry for making predictions in respect of instruction flow changing instructions, and to control which instructions are identified in the fetch queue in dependence on those predictions. The prediction circuitry includes a target prediction storage having a plurality of entries that are used to identify target addresses for instruction flow changing instructions that are predicted as taken. The instruction flow changing instructions can take a variety of forms, for example function call instructions, function return instructions, branch instructions, etc. In particular, any instruction that can cause a discontiguous jump in the instruction address space between that instruction and the next instruction to be executed will be referred to herein as an instruction flow changing instruction. For simplicity herein, all such instruction flow changing instructions may be referred to as branch instructions.

The target prediction storage comprises at least one entry that is configurable as a multi-taken entry to indicate that a source instruction flow changing instruction identified by that entry is a first instruction flow changing instruction with an associated first target address that identifies a series of instructions that is expected to exhibit static behaviour and that terminates with a second instruction flow changing instruction, where the second instruction flow changing instruction is unconditionally taken and has an associated second target address.

If the series of instructions is expected to exhibit static behaviour, this means that the behaviour of that series of instructions will not change each time that series is encountered. As a result, this means that if the first instruction flow changing instruction is taken, causing a branch to the associated first target address, it is expected that all of the series of instructions will be executed, resulting in the second instruction flow changing instruction also being executed. Further, given that that second instruction flow changing instruction is unconditional, it is known that that second instruction flow changing instruction will be taken and hence will result in a branch to the associated second target address.

As a result, the prediction circuitry can be arranged, when making a prediction for a chosen instruction flow changing instruction that is identified by a multi-taken entry in the target prediction storage, to identify with reference to the target address information stored in the multi-taken entry both the series of instructions and a target instruction at the second target address. It can then cause the series of instructions and the target instruction to be identified in the fetch queue, and there is no need to make any predictions in respect of the series of instructions. Instead, the prediction circuitry can then begin making further predictions starting from the target instruction at the second target address. Since the prediction circuitry can skip the series of instructions, and in particular does not need to make any predictions in respect of those instructions due to the fact that they are expected to exhibit static behaviour, this increases the effective throughput (also referred to herein as bandwidth) of the prediction circuitry. Furthermore, the prediction accuracy is maintained, since it is expected that the series of instructions will exhibit static behaviour.

There are a number of ways in which it can be determined whether the series of instructions is expected to exhibit static behaviour. In one particular implementation it is determined that that series of instructions will exhibit static behaviour if none of those instructions are conditional instruction flow changing instructions, and if none of those instructions are indirect branch instructions. In particular, any conditional instruction flow changing instruction will need a branch direction prediction to be made in order to determine whether that instruction is taken or not taken, and this is indicative of dynamic behaviour, in that the behaviour will be based on the processor's status each time that instruction is encountered. Similarly, an indirect branch instruction (whether conditional or unconditional) will typically have dynamic behaviour, since the target address will vary dependent on the register contents used to identify the branch target address.

In one example implementation, for the series of instructions to be determined to exhibit static behaviour, it will be necessary for the second instruction flow changing instruction to be predicted to be the only instruction flow changing instruction in the series of instructions (and hence the multi-taken entry may be referred to as a two-taken entry). Thus, in such an implementation, the series of instructions will be formed by one or more instructions occupying sequential addresses in memory, with that series being terminated by the second instruction flow changing instruction. It will be appreciated that in principle the series could contain just a single instruction, i.e. the second instruction flow changing instruction, but in many scenarios it is expected that the series of instructions will be formed of multiple instructions that terminate with the second instruction flow changing instruction.

Whilst in one implementation the instruction flow changing instruction will be predicted to be the only instruction flow changing instruction in the series of instructions, in an alternative implementation this may not be the case. In particular, the series of instructions could in principle comprise multiple blocks of instructions that are linked by unconditional direct branch instructions. In such a scenario, that series of instructions may still be expected to exhibit static behaviour, since the unconditional direct branch instructions will always be taken, and their target addresses will be static. Provided the required information about those linked blocks of instructions can be captured within the multi-taken entry, then a multi-taken entry can be created in such scenarios.

The information maintained within each multi-taken entry can take a variety of forms. In one implementation, each multi-taken entry is configured to identify as the target address information at least the first target address and a length value used to identify the number of instructions in the series of instructions. Due to the earlier-discussed requirements for creating a multi-taken entry, it is then known that the series of instructions terminates with the second instruction flow changing instruction, which is unconditionally taken. In some instances, the multi-taken entry may be further configured to identify as part of the target address information the second target address. However, in some instances there may be no need to capture the second target address directly within the multi-taken entry, since it may be possible to determine the second target address information from another prediction structure provided within the prediction circuitry. For example, in situations where the second instruction flow changing instruction is a function return instruction, then the second target address may be obtained from a return stack structure maintained by the prediction circuitry, and accordingly there is no requirement to capture the second target address directly within the multi-taken entry.

Whilst the target prediction storage could have dedicated entries for storing multi-taken information, in one example implementation the various entries within the target prediction storage can be used either as single taken entries or multi-taken entries, and accordingly the space available within an entry is the same irrespective of whether the entry forms a single-taken entry or a multi-taken entry. In such a scenario, it may be necessary to place some constraints on the differences between the various addresses that are to be identified within the multi-taken entry. For example, in one implementation, for an entry to be configured as a multi-taken entry an offset constraint is required to be met between the addresses of the first instruction flow changing instruction, the second instruction flow changing instruction and the target instruction at the second target address.

In one particular example arrangement, the prediction circuitry is arranged to process predict blocks, where each predict block comprises a plurality of instructions at sequential addresses in memory, and to output prediction information for each predict block. In such an arrangement, the offset constraint may be specified with reference to a start address of the predict blocks containing the first instruction flow changing instruction, the second instruction flow changing instruction and the target instruction at the second target address. Purely by way of example, in one specific implementation it may be required that the start address of the predict blocks containing the first instruction flow changing instruction and the second instruction flow changing instruction are in the same 4 KByte (KB) aligned block within the memory address space, and it further may be required that the start address of the predict block containing the first instruction flow changing instruction and the start address of the predict block containing the target instruction at the second target address is in the same 32 KB aligned block. When such constraints are applied, this enables a number of the most significant bits of the start address of the predict blocks for the second instruction flow changing instruction and the target instruction at the second target address to be inferred from the address information encoding the start address of the predict block containing the first instruction flow changing instruction. Accordingly, it is possible to provide information about the start address of the predict blocks for the second instruction flow changing instruction and the target instruction at the second target address within the space typically allocated within an entry for a single target address.

If desired, a constraint may also be placed on the number of instructions that may be present within the above-mentioned series of instructions that is expected to exhibit static behaviour. As one specific example, there may be a restriction that the number of instructions in the series of instructions identified by the length value does not exceed 16 (which in one example may mean that the series does not extend beyond two sequential predict blocks).

There are a number of ways in which multi-taken entries may be distinguished from single-taken entries. For example, there may be a dedicated region within the target prediction storage that is reserved for multi-taken entries. However, in one implementation each entry can be used as either a multi-taken entry or as a single taken entry, and each entry may comprise a multi-taken flag which, when set, identifies that the entry is a multi-taken entry. Conversely, if the flag is cleared, this indicates that the entry is a single-taken entry.

In some implementations, it may be desirable to place some restrictions on the form of the second instruction flow changing instruction, such that a multi-taken entry may only be created if the second instruction flow changing instruction is of an allowed type. For example, in one implementation the second instruction flow changing instruction is one of:
(i) an unconditional direct branch instruction;
(ii) an unconditional function return instruction.

For both of these types of unconditional instruction, the branch target address can be readily determined. For example, for an unconditional direct branch instruction, the target address can be determined directly from the information in the branch instruction itself. Further, for a function return instruction, the target address may be determined from the contents of a return stack maintained by the prediction circuitry.

In one example implementation, it will not be allowed to create a multi-taken entry if the second instruction flow changing instruction is an unconditional indirect branch instruction. For example, if the prediction circuitry has a dedicated indirect predictor then it may be considered inappropriate to allow a two-taken entry to be created. In particular, for the dedicated indirect predictor to calculate the target address, the prediction circuitry will need to receive as its input a predict block identifying the series of instructions captured within the multi-taken entry, but as will be apparent from the earlier discussion that block is skipped by the prediction circuitry if a multi-taken entry is provided, and hence that information will not be input to the prediction circuitry.

As mentioned earlier, in one example implementation, the second instruction flow changing instruction may be an unconditional function return instruction. In one example, when the second instruction flow changing instruction identified by a multi-taken entry is the unconditional function return instruction, and the first instruction flow changing instruction is not an associated function call instruction, the prediction circuitry is arranged, when making a prediction using that multi-taken entry, to reference a return address prediction structure (such as a return stack) to determine the second target address. In one such implementation, it may be checked that the return stack is non-empty before allowing a prediction based on such a multi-taken entry to be made. If the return stack is empty, then in one example implementation the prediction circuitry may treat the multi-taken entry as a single taken entry branching to the first target address, and then resume making further predictions starting from the first target address.

In one example implementation, a multi-taken entry can be allocated in situations where the first instruction flow changing instruction is a function call instruction and the second instruction flow changing instruction is an associated unconditional function return instruction. In such a scenario, it will be understood that there will be no instruction flow changing instructions between the function call instruction and its associated function return instruction. In such an implementation, the second target address will be the address that sequentially follows the address of the first instruction flow changing instruction. In one particular implementation, this second target address does not need to be explicitly captured within the multi-taken entry and instead can be implied from flag information in the multi-taken entry identifying that the first instruction flow changing instruction is a function call instruction and that the second instruction flow changing instruction is an associated unconditional function return instruction.

In one implementation the target prediction storage may be a set associative storage comprising multiple ways. It is known to provide way prediction mechanisms in such systems, so that certain ways may be disabled for some accesses, thereby saving power. In particular, if a prediction is made using an entry of the target prediction storage, and the target address for that entry is static, then way prediction information can be captured in that entry, for use when subsequently accessing the target prediction storage based on the target address. For a single taken entry associated with a function return instruction, the target address is not static and needs to instead be retrieved from a return stack structure, and so typically it has not been possible to capture way prediction information in association with entries relating to a function return instruction.

However, when creating the above type of multi-taken entry, where the first instruction flow changing instruction is a function call instruction and the second instruction flow changing instruction is an associated unconditional function return instruction, the target is statically known (it is the sequential address following the address of the function call instruction, and the address of the function call instruction is held in the entry as the source information), and hence in such entries it is possible to store way prediction information that can be used when subsequently accessing the target prediction storage using the target address of the function return instruction.

In one example implementation, the prediction circuitry further comprises direction prediction circuitry to determine whether a conditional instruction flow changing instruction is to be taken or not taken, and when the chosen instruction flow changing instruction is a conditional instruction the prediction circuitry is arranged to make the prediction using the multi-taken entry when the direction prediction circuitry predicts that the chosen instruction flow changing instruction will be taken. It should however be noted that there is no requirement for the first instruction flow changing instruction identified by a multi-taken entry to be conditional, and a multi-taken entry can be generated irrespective of whether the first instruction flow changing instruction is conditional or unconditional.

There are a number of ways in which the apparatus can be arranged so as to enable situations to be detected where multi-taken entries can be allocated. In one example implementation, the apparatus further comprises multi-taken condition detection circuitry to monitor the instructions in the fetch queue, and feedback information provided by decode circuitry used to decode the instructions fetched for execution by the execution circuitry, in order to detect a multi-taken condition where a multi-taken entry can be created for a source instruction flow changing instruction. The target prediction storage is then arranged to allocate a multi-taken entry when notified by the multi-taken condition detection circuitry of the presence of the multi-taken condition. Hence, the information maintained in the fetch queue can be used to determine candidate sequences for which a multi-taken entry may be allocated, and then feedback information provided by the decode circuitry can be used to confirm whether such a sequence is indeed a sequence for which a multi-taken entry can be allocated. The feedback information can take a variety of forms but in one implementation identifies when a series of decoded instructions exhibits static behaviour.

In situations where the multi-taken condition detection circuitry identifies the multi-taken condition, then the target prediction storage may be arranged to determine from the fetch queue the information required to populate the allocated multi-taken entry.

The target prediction storage can take a variety of forms, and for example may be a main target prediction storage or a micro target prediction storage. A micro target prediction storage is used to cache prediction information maintained by a main target prediction storage, and in such implementations both the micro target prediction storage and the main target prediction storage are accessed for each predict block in order to provide information which is then used to make a prediction for the predict block. Typically, a hit within the main target prediction storage will be used to override any differing prediction made using a hit in the micro target prediction storage, since the main target prediction storage is generally considered to provide more accurate information.

In implementations where the target prediction storage is a micro target prediction storage, it may be that the main target prediction storage is also arranged to maintain multi-taken entries. In such implementations, the micro target prediction storage may directly cache multi-taken entries created by the main target prediction storage. However, alternatively, or in addition, the micro target prediction storage may have its own associated circuits for detecting situations where multi-taken entries can be created within the micro target prediction storage.

For example, the apparatus may further comprise multi-taken condition detection circuitry to monitor the predictions made by the main target prediction storage to detect a multi-taken condition when the main target prediction storage predicts that a series of instructions is expected to exhibit static behaviour and terminates with an instruction flow changing instruction that is unconditionally taken. The micro target prediction storage is then arranged to allocate a multi-taken entry in response to the multi-taken condition detection circuitry indicating presence of the multi-taken condition. Hence, in such situations the micro target prediction storage may be able to allocate multi-taken entries even if the main target prediction storage has not.

In one particular example implementation, the micro target prediction storage is arranged to process predict blocks, where each predict block comprises a plurality of instructions at sequential addresses in memory, and to output prediction information for each predict block. The micro target prediction storage has a plurality of pipelined stages, including at least two post-prediction pipelined stages for maintaining information about predict blocks for which a prediction has already been made by the micro target prediction circuitry. In the presence of the multi-taken condition, the micro target prediction circuitry is arranged to determine the information required to populate the allocated multi-taken entry with reference to the information about predict blocks that is held in said at least two post-prediction pipelined stages. Hence, in such an implementation the micro target prediction storage maintains information in its pipelined stages for a period of time so that that information is available in due course if it is decided that a multi-taken entry can be allocated.

In situations where the micro target prediction storage itself decides when to create multi-taken entries, then an issue can arise when the information stored in the main target prediction storage is updated. In particular, in such situations, it may be difficult to determine whether such updates have affected the accuracy of the multi-taken entries maintained by the micro target prediction storage. For example, it may no longer be true that the series of instructions identified by the multi-taken entry exhibit static behaviour.

In one example implementation, in order to deal with such a scenario, the apparatus is arranged such that when an update is made to the information stored in the main target prediction storage, the micro target prediction storage is arranged to invalidate any entry marked as a multi-taken entry. In one example implementation, if the micro target prediction storage can maintain multi-taken entries cached directly from those created by the main target prediction storage, and also maintain multi-taken entries that it has created itself, then only the latter type of multi-taken entries may be invalidated at this point.

If during the process of making predictions an inconsistency is observed between the single taken/multi-taken status of an entry maintained by the main target prediction storage and the status of a corresponding entry maintained by the micro target prediction storage, then that inconsistency can be removed by changing the status of the entry in the micro target prediction storage. For example, if the main target prediction storage has a multi-taken entry and the corresponding entry in the micro target prediction storage is a single taken entry, the entry in the micro target prediction storage can be upgraded to a multi-taken entry. Similarly, if the main target prediction storage has a single taken entry and the corresponding entry in the micro target prediction storage is a multi-taken entry, the entry in the micro target prediction storage can be downgraded to a single taken entry.

There are a number of ways in which the information required by a multi-taken entry can be captured within the target prediction storage. For example, if the target prediction storage comprises a plurality of banks, it may be possible to use an entry in a first bank and an associated entry in a second bank to store the required information. For example, when an entry in a first bank is marked as a multi-taken entry, an associated entry in a second bank may be selectively allocated to store at least a portion of the target address information for the multi-taken entry. In such situations, if the entry in the first bank has a multi-taken flag set, this can be used to infer that a portion of the target address information from the multi-taken entry should be obtained from the associated entry in the second bank. Such an arrangement may be used for instance within a micro target prediction storage.

For example, such a micro target prediction storage may have a first bank used to store an indication of a source instruction flow changing instruction in a first field, and then associated target address information in a second field, but may have a second bank which is used for certain types of instruction flow changing instructions where the target address information can be inferred from other structures. For example, for a function return instruction, the second bank can be used merely to capture information about the function return instruction, but there is no need to also capture the target address information, since that can be obtained from the return stack structure. In such implementations, the second bank can be selectively allocated to store at least a portion of the target address information for a multi-taken entry.

By way of specific example, the multi-taken entry in the first bank may be configured to identify the first instruction flow changing instruction, the associated first target address, and an indication of the number of instructions in the first series of instructions, and the associated entry in the second bank may be selectively allocated to identify the second target address associated with the second instruction flow changing instruction. It should also be noted that in some instances there may be no need to allocate the associated entry in the second bank. For example, if the second instruction flow changing instruction is a function return instruction, then the second target address can be obtained from the return stack, and accordingly there is no need for the associated entry in the second bank to be used. In one implementation, for multi-taken entries that do use both the entry in the first bank and the associated entry in the second bank, then an indication of the number of instructions in the first series of instructions can be stored within the associated entry in the second bank, freeing up more encoding space within the first entry.

In some example implementations, it may be appropriate in response to certain trigger conditions to convert a multi-taken entry into a single taken entry which identifies the first instruction flow changing instruction and the associated first target address. For example, if self-modifying code (or cross-modifying code) is executed by the apparatus, the instructions at particular instruction addresses may change. Accordingly, in one example implementation, the trigger condition may occur when decode circuitry used to decode instructions fetched for execution by the execution circuitry determines that the series of instructions comprises at least one instruction that exhibits dynamic behaviour. To assist in making this determination, the series of instructions associated with a multi-taken entry can be flagged in the fetch queue, so that the decode circuitry then performs an analysis of those instructions to check that they are still exhibiting static behaviour, and if they are instead exhibiting dynamic behaviour (for example because a conditional branch instruction has been inserted into that series of instructions), then the trigger condition can be raised to cause the multi-taken entry to be demoted back to a single taken entry.

As another example, the trigger condition may occur when decode circuitry used to decode instructions fetched for execution by the execution circuitry determines that the instruction terminating the series of instructions is no longer an instruction flow changing instruction.

As mentioned earlier, the prediction circuitry may be arranged to process predict blocks. Each predict block may comprise M instructions at sequential addresses in memory, and the prediction circuitry will then output prediction information for each predict block. The size of the series of instructions that may be identified in a multi-taken entry may vary dependent on implementation, but in one implementation that size may be restricted so that it can comprise up to M instructions, and hence at a maximum will contain an entire predict block, but not more than one predict block. By placing this constraint on the series of instructions, it makes it easier to identify situations for which multi-taken entries can be created.

Particular examples will now be described with reference to the Figures.

FIG. 1 is a block diagram of an apparatus in accordance with one example implementation. The apparatus includes a branch predictor 10 that has associated therewith a fetch queue 40 (also referred to as a prediction address queue) that acts as an interface between the branch predictor and other components within the apparatus. In particular, the fetch queue identifies instruction addresses that are used to fetch instructions for execution by one or more execution units of the apparatus. Those addresses can be routed to an instruction cache 45 that retrieves the instructions at the identified addresses (if a hit is detected in the instruction cache for an input address, then the instruction can be output directly from the instruction cache, whereas otherwise the instruction can be requested from a lower level of a memory hierarchy forming the memory system and, when retrieved, can be output from the instruction cache). The fetched instructions are then forwarded to an instruction decoder 55 where they are decoded in order to produce control signals used to control the operation of the execution units so as to implement the operations required by those instructions.

In many systems, the instruction addresses identified in the fetch queue may be virtual addresses, and an instruction translation lookaside buffer (TLB) 50 can be referred to in order to convert those virtual addresses into physical addresses within the memory system, enabling the instructions to be fetched from the memory hierarchy as required.

The branch predictor 10 may be arranged during each prediction iteration to consider a predict block of instructions, where the predict block comprises a plurality of sequential instructions within the memory address space. The predict block may for example be identified by a start address identifying the first instruction address within the predict block, and the size of the predict block will typically be predetermined. For example, a 32 Byte predict block may be considered in each prediction iteration, and in one particular implementation each instruction may have an instruction address formed of 4 Bytes, such that each predict block represents eight instructions at sequential addresses in memory.

Each predict block is output by the multiplexer 15, and is added into the fetch queue, whilst also being provided to various branch prediction mechanisms within the branch predictor 10. The aim of the branch predictor is to predict whether any instructions identified by the predict block are instruction flow changing instructions that are predicted as taken. In the event that the predict block includes one or more of such instructions, then the location of the first instruction flow changing instruction that is predicted as taken is identified, and the target address of that instruction flow changing instruction is used to identify the start address for the next predict block. If no such instruction flow changing instructions are identified within the predict block, then the start address for the next predict block is merely the sequential address following the last address of the current predict block.

When the branch predictor 10 predicts that a predict block does include an instruction flow changing instruction that is predicted as taken, then the position of that instruction flow changing instruction is used to modify the content of the predict block as added into the fetch queue. For example, if it is determined that the fourth instruction in the sequence of eight identified by a predict block is predicted as taken, then the final four instructions will be discarded from the sequence of instructions identified within the fetch queue, so that those later instructions are not fetched for execution by the execution circuitry, and instead the next instruction fetched after the fourth instruction in that predict block will be the instruction at the predicted target address for the instruction flow changing instruction (i.e. the first instruction in the next predict block).

The branch predictor 10 can include a number of branch prediction components. As shown in FIG. 1, a branch direction predictor 35 can be used for seeking to predict whether a conditional instruction flow changing instruction will be taken or not taken. If an instruction flow changing instruction is not taken, then the next instruction to be executed will be the instruction immediately following that instruction flow changing instruction in the instruction address space. However, if the instruction flow changing instruction is predicted as taken, then a determination of the target address for that instruction is required, as the next instruction that will be predicted to be executed will be the instruction at that target address.

To assist in the prediction of target addresses, one or more branch target buffer (BTB) structures may be provided. For example, as illustrated in FIG. 1, a main BTB 20 may be provided for making a prediction of the target address of an instruction flow changing instruction that is predicted as taken. Hereafter, any instruction flow changing instruction (whether formerly identified as a branch instruction, or some other instruction that causes a discontinuous change in instruction flow, such as a function call instruction or a function return instruction) will be referred to as a branch instruction. Hence, for a branch instruction that is predicted as taken, the BTB 20 can be used to assist in the determination of a target address for that branch instruction. In particular, an entry may be provided for that branch instruction, and may include information that is used to determine a predicted target address. That predicted target address may be encoded directly within the entry of the BTB, or alternatively a further target prediction structure may be referenced in order to predict the target address. For example, if the BTB entry 20 identifies that the branch instruction is a function return instruction, then the target address itself may not be identified within the BTB entry, but instead a return stack structure will be referred to in order to obtain the predicted target address.

As shown in FIG. 1, the branch predictor 10 can be arranged as a pipelined circuit, and in this example contains three stages. Predictions may be made in the second stage, based on outputs provided by the various branch prediction structures 20, 25, 35 in the first stage. As will be discussed in more detail later, a third stage can also be provided for detecting situations where a two-taken entry may be allocated into a micro-BTB 25.

In addition to the main BTB 20, the micro-BTB 25 may be provided. The micro-BTB is a smaller structure than the main BTB, and can effectively be considered to be a cache of the main BTB. Since the output from the micro-BTB will hence be available more quickly, it can be routed directly back to the multiplexer 15 to influence the next predict block to be considered. Hence, whilst the prediction logic 30 is evaluating in the second (P2) stage the outputs that it has received from the various branch prediction structures 20, 25, 35, the first (P1) stage can be used to make a prediction for a next predict block, where that next predict block is either the sequentially following predict block, or a predict block identified with reference to the micro-BTB contents. If the prediction logic 30 then identifies that the next predict block is in fact the predict block that has been considered, then no corrective action is required, and the prediction logic 30 can then in the next cycle review the new contents received from the P1 stage. However, if the prediction logic determines that the assumption made for the next predict block is wrong, then a different next predict block can be identified by the prediction logic 30 and routed back to the multiplexer 15, with the intervening predict block that was considered in the P1 stage then being discarded.

The throughput of the branch predictor 10 can effectively represent a bottleneck within the system. In particular, the fetch queue 40 may be able to receive multiple blocks of instructions in a single cycle, but the branch predictor itself may only be able to receive and process a single block of instructions in one cycle. In accordance with the techniques described herein, a mechanism is provided that enables two-taken entries to be populated within the main BTB 20 and/or the micro-BTB 25 to enable two blocks of instructions to be added into the fetch queue in a single cycle, with prediction for one of those blocks being skipped by the branch predictor 10. This can occur without any loss of prediction accuracy, due to the mechanism used to identify when two-taken entries can be created ensuring that they are only created in instances where no separate prediction is required for the first of the two blocks added into the fetch queue, and the contents of the two-taken entry are sufficient to allow the next predict block to be accurately identified.

Figure 2:
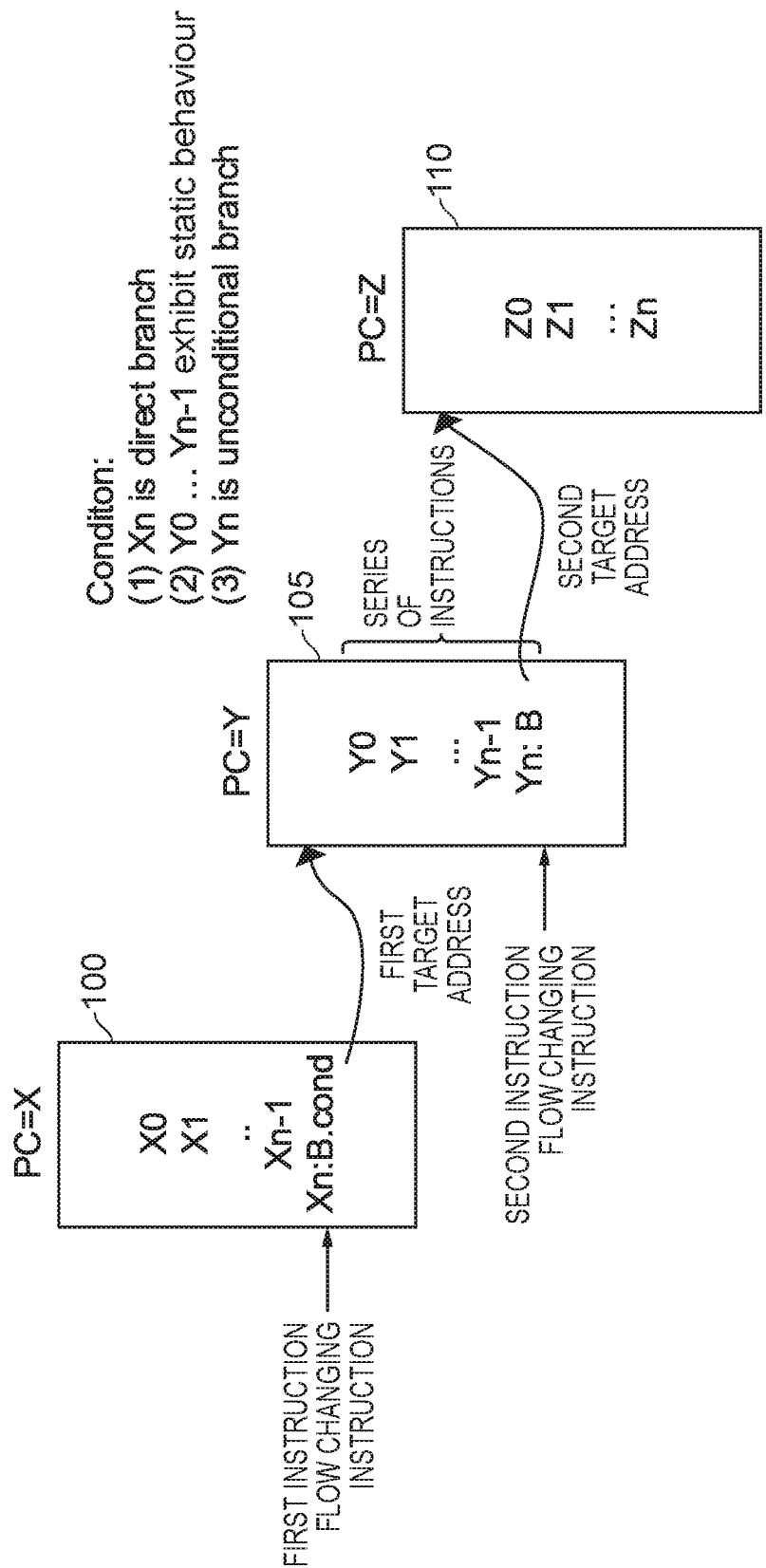
FIG. 2 schematically illustrates an instruction flow sequence which can be represented by a two-taken entry within the branch target buffer (BTB) structures of FIG. 1 in accordance with one example arrangement.

FIG. 2 schematically illustrates a sequence of predict blocks that can be captured within a single two-taken entry within the main BTB 20 and/or micro-BTB 25 in accordance with one example implementation. In this instance, a first predict block X 100 is assumed to contain a branch instruction that is predicted as taken and that results in the identification of a first target address identifying the next predict block Y. This second predict block Y is expected to exhibit static behaviour, and terminates with an unconditional branch instruction that branches to the predict block Z. In such situations, it has been found possible to create an entry within the BTB structure that identifies as the source instruction the branch instruction within the predict block X, along with an indication of the associated first target address, and in addition captures sufficient information about the predict block Y and the resulting second target address to enable both the predict blocks Y and Z to be added directly into the fetch queue, but with the next prediction iteration starting with the predict block Z. In particular, no prediction is required to be made by the branch predictor 10 in respect of the predict block Y. An entry that incorporates all of that required information will be referred to herein as a two-taken entry.

Branch instructions can be categorised into two types, namely those exhibiting dynamic behaviour and those exhibiting static behaviour. Dynamic behaviour branch instructions change their behaviour dependent on the status of the processor executing those instructions. Hence, dynamic branch instructions include any form of conditional branch instruction, since a direction prediction is required in order to determine whether the branch will be taken or not taken, and typically an assessment of certain condition flags of the processor is required in order to determine whether the branch will be taken or not. As another example of a dynamic behaviour branch instruction, polymorphic indirect branches will also be considered to exhibit dynamic behaviour, since typically the target address will depend on the contents of at least one general purpose register, and those contents will vary between instances where that indirect branch instruction is executed.

Static behaviour branch instructions are then the remaining branch types. Hence, any unconditional direct branch instruction will be considered to exhibit static behaviour, since it will always be taken, and the target address can be determined directly from the branch instruction itself, and hence does not vary each time the unconditional direct branch instruction is executed. Also, for the purposes of the techniques described herein, unconditional function return instructions can be considered to exhibit static behaviour since, despite the fact that the target address can vary (for example due to different function call instructions being associated with the same function return instruction), the target address is predictable in that it can be obtained from a return stack structure.

Returning to FIG. 2, for the two-taken entry to be able to be formed, it does not matter whether the first branch instruction, i.e. the branch instruction terminating the predict block 100, is conditional or unconditional, since the branch direction predictor can be accessed during the same prediction iteration in order to evaluate whether that branch instruction is taken or not. However, the first target address needs to be deterministic, since it is necessary to identify information about the predict block Y within the BTB entry. In the example illustrated in FIG. 2, it is assumed that the first branch instruction is a direct branch instruction, and accordingly the first target address is directly determinable from the contents of the branch instruction itself.

In addition, the series of instructions forming the predict block Y need to exhibit static behaviour. Accordingly, all of those instructions need to be expected to either not be branch instructions, or to be unconditional branch instructions with a target that is readily predictable, such as is the case for unconditional direct branch instructions. In the examples discussed hereafter, it will be assumed that the series of instructions forming the predict block Y contains no branch instructions other than the branch instruction that terminates that predict block. Further, it is assumed that the branch instruction that terminates the predict block exhibits static behaviour, in that it is an unconditional branch instruction, and its target meets the above-mentioned static behaviour requirements. Hence, for the example implementation discussed herein the branch instruction at the end of the predict block Y will either be an unconditional direct branch instruction or an unconditional function return instruction. As will be discussed in more detail later, the two-taken entry can in that instance provide sufficient information to enable the first target address to be identified, the length of the predict block Y to be identified, and the second target address to be identified. As a result, both the predict blocks Y and Z can be added into the fetch queue based on a prediction made using that two-taken entry, and the next prediction iteration may then begin starting with the predict block Z.

Figure 3:
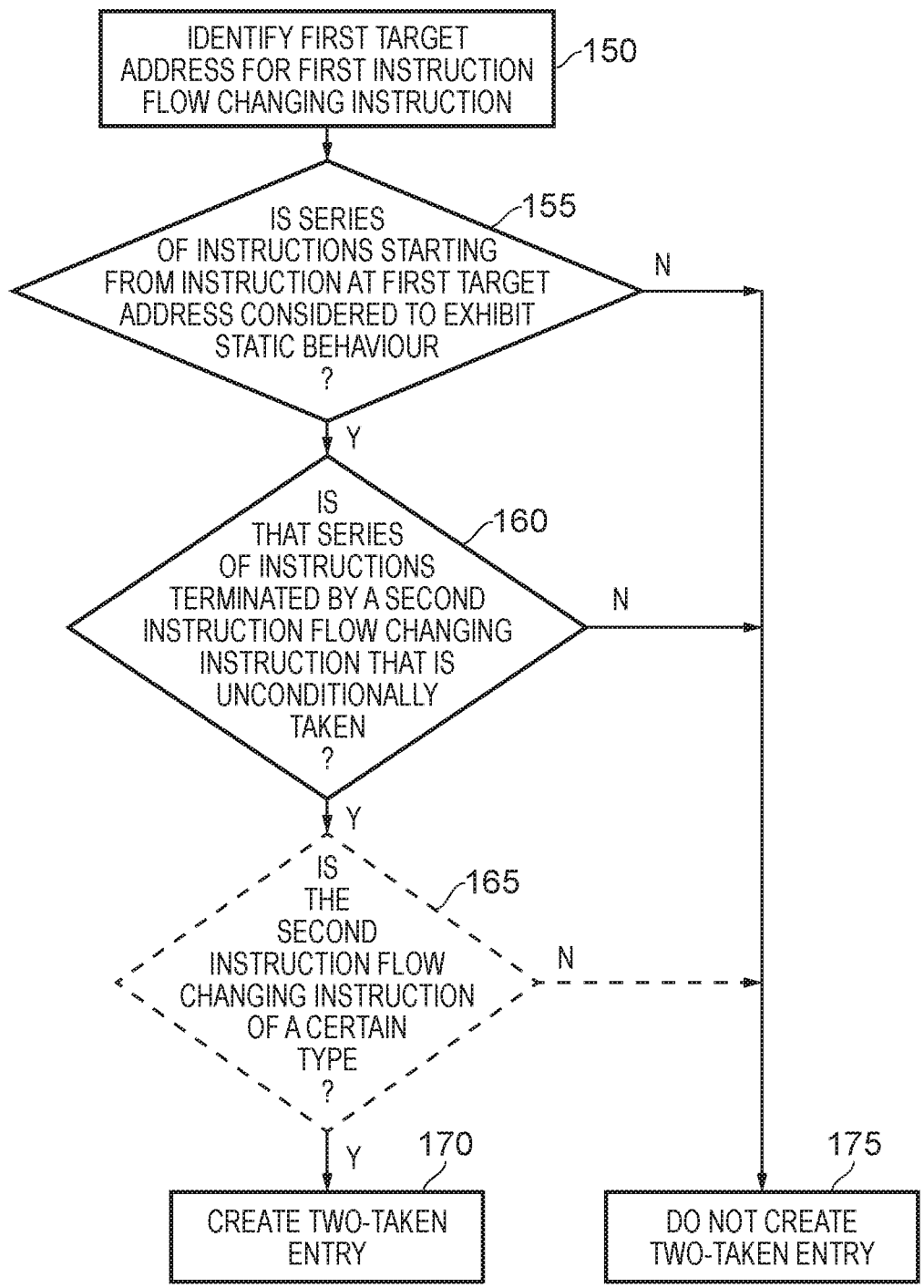
FIG. 3 is a flow diagram illustrating a sequence of steps that can be performed to detect a two-taken condition, allowing a two-taken entry to be allocated into the branch target buffer, in accordance with one example arrangement.

FIG. 3 is a flow diagram illustrating the steps that may be performed in order to detect a two-taken condition that allows a two-taken entry to be allocated into one of the BTB structures. As will be discussed in more detail later, with regards to the main BTB 20, this process can be implemented by the two-taken detection circuitry 60 shown in FIG. 1, which can determine from the contents of the fetch queue 40 and feedback information from the instruction decode circuitry 55 when the two-taken condition is present, whereas for the micro-BTB 25 the process can be performed by the two-taken detection circuitry 65 based on information output by the prediction logic 30. As will be discussed later for the micro-BTB 25 example, the micro-BTB can keep certain information within its pipeline stages to enable a two-taken entry to be allocated when the two-taken detection circuitry 65 detects the two-taken condition.

Returning to FIG. 3, at step 150 the first target address for the first instruction flow changing instruction is identified. It is then determined at step 155 whether the series of instructions starting from the instruction at that first target address is considered to exhibit static behaviour. As discussed earlier with reference to FIG. 2, this can be determined if none of the instructions within that series is a conditional branch instruction or an indirect branch instruction. In one particular implementation, this condition is considered to be met if none of the instructions in the series, other than the final terminating instruction, is a branch instruction.

If it is determined at step 155 that the series of instructions does not meet the specified condition, then at step 175 a multi-taken entry is not created. However, if the condition specified at step 155 is met, then it is determined at step 160 whether that series of instructions is terminated by a second instruction flow changing instruction that is unconditionally taken. If not, then again the process proceeds to step 175 where a multi-taken entry is not created. However, if the final instruction is an unconditionally taken branch instruction, then at this point a two-taken entry may be created at step 170. However, as indicated by the dotted box 165, as an optional step it may be determined whether the second instruction flow changing instruction is of a specific type. In particular, as discussed earlier, in one example implementation it is determined whether the unconditional branch instruction is an unconditional direct branch instruction or an unconditional function return instruction, and only if that is true does the process proceed to step 170 where the two-taken entry is created. Otherwise, the process proceeds to step 175 where a two-taken entry is not created.

Figure 4A:
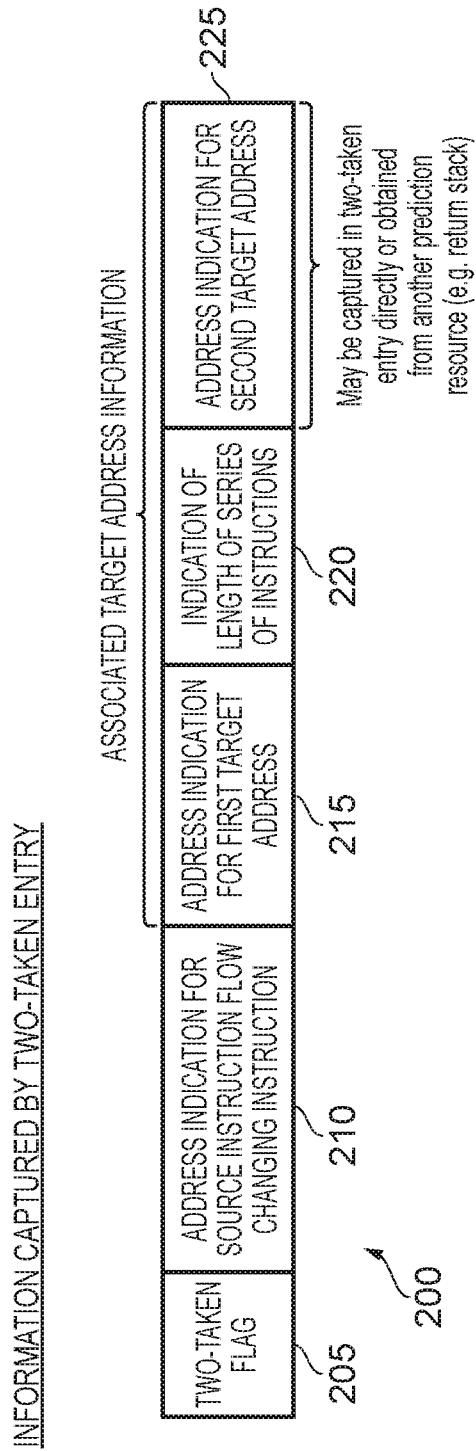

FIG. 4A schematically illustrates the information that may be captured in association with the two-taken entry. Whilst in some implementations specific entries within the BTB structure could be reserved for two-taken entries, in the implementations described herein it is assumed that all entries within the BTB can be used as either traditional single taken entries or as two-taken entries, and a two-taken flag 205 is used to indicate whether the entry is a two-taken entry or a standard single taken entry. Hence, if the two-taken flag 205 is set, then this indicates that the entry is a two-taken entry, and influences how the remaining portions of the entry are interpreted.

A source field 210 is used to provide an address indication for a source instruction flow changing instruction, and when the two-taken flag is set this source instruction flow changing instruction will be the first instruction flow changing instruction identified in FIG. 2. The entry also has associated target address information. Some of this target address information may be provided in a specific target address field, while other parts of that information may be contained elsewhere, for example within certain flag fields of the entry. However the information is stored within the entry in order to provide the associated target address information, that associated target address information will include an address indication 215 for the first target address, and an indication 220 of the length of the series of instructions forming the intermediate block (i.e. the block Y shown in FIG. 2). There may be a restriction on the length that can be encoded within the length field of the two-taken entry. As one specific example, there may be a restriction that the number of instructions in the series identified by the length value does not exceed 16.

For a two-taken entry to be formed, it will be understood that that intermediate block is terminated by an unconditional branch instruction, and the entry 200 also provides information sufficient to provide an address indication 225 for the second target address, i.e. the target address of that unconditional branch instruction. In some instances, this address indication 225 may be captured directly in the two-taken entry, but in other instances it may be unnecessary to capture that information directly, and that information may be able to obtained from another prediction resource. For example, one or more flags in the entry could be used to identify the type of the branch instruction that forms the second instruction flow changing instruction in the sequence shown in FIG. 2, and if that branch type is indicated as being a return type, i.e. the branch instruction is a function return instruction, then the second target address may not be captured directly, and instead that flag information can be used to identify that the second target address should be obtained from the return stack.

FIGS. 4B to 4D illustrate in more detail the information captured within two-taken entries in accordance with implementations described herein. FIG. 4B shows a general two-taken entry where the target address information that is captured identifies both the first target address and the second target address. Various flags may be provided within the two-taken entry 230. As per the discussion of FIG. 4A, one of the flags can be a two-taken entry flag to identify whether the entry is a two-taken entry or a single-taken entry. In the event that the entry is a two-taken entry, then if desired both the first branch type and the second branch type can be identified within the flags fields, thus identifying the types of both the first instruction flow changing instruction and the second instruction flow changing instruction. As mentioned earlier, for a two-taken entry to be formed, the second branch instruction must be unconditional, but the first branch instruction can be either conditional or unconditional. Accordingly, in one implementation the first branch type field can also be supplemented to provide an indication as to whether the first branch is a conditional branch or not. As also shown in FIG. 4B, the length of the intermediate block Y can be captured within the flags information, and a valid (V) flag can be used to identify whether the entry's content is valid.

Further, a source address field is used to identify the address of the first branch instruction, i.e. address Xn using the example of FIG. 2. The target address information field is then used to capture both an indication of the first target address (Y0 in the example of FIG. 2), and an indication of the second target address (Z0 in the example of FIG. 2). Since the target address information field within the entry will typically not be large enough to allow two target addresses to be fully specified independently, then in one implementation some restrictions may be placed on the correspondence between the first and the second target addresses, and the source address of the first branch instruction. In particular, in situations where the target addresses do not differ significantly from the source address, then a certain number of the most significant bits may be shared between the various addresses, and hence not need to be captured separately. It has been found that when such a constraint is applied, it still allows two-taken entries to be created in many useful use cases. In one very specific implementation, it is a requirement that the first target address Y0 and the source address Xn are in the same 4 KB aligned block within the memory address space, and it is further required that the second target address X0 and the source address Xn are in the same 32 KB aligned block. With such constraints in place, it has been found that the indications of the two target addresses can be reliably captured within a standard size field provided for capturing the target address of a single-taken entry.

In one implementation, the main BTB is a set associative storage comprising multiple ways. It is known to provide way prediction mechanisms in such instances, so that certain ways may be disabled for some accesses in order to save power. In particular, if a prediction is made using an entry of the BTB, and the target address for that entry is static, as will be the case for a two-taken entry such as indicated by the entry 230 of FIG. 4B, then way prediction information can be captured within the flags field, for use when subsequently accessing the BTB based on the target address. For example, it may be identified that in association with the target address Z0, only ways 0 and 1 need to be accessed, and ways 2 and 3 are predicted as not containing entries relevant to the predict block identified by the target address Z0 (this purely being an illustrative example, assuming a four way set associative cache).

FIG. 4C illustrates another example two-taken entry 240, in situations where the second branch is a return instruction, and the first branch is not the associated function call instruction. Since the second branch is a return instruction, there is no need to capture the second target address directly within the entry, and accordingly a more full indication of the first target address Y0 can be captured within the entry. Thus the above-mentioned constraints need not apply to such a two-taken entry. Typically, for such entries, way prediction information cannot be captured, since the second target address is not statically defined within the entry, and instead is obtained by referencing a return stack.

FIG. 4D illustrates another example scenario, where the first branch instruction is a function call instruction, and the second branch instruction is the associated function return instruction. In such a scenario, it is known that there are no branch instructions between the call instruction and the associated return instruction. Further, for such a two-taken entry, the second target address is implicitly known without needing to capture it directly within the entry. In particular, it is known that the second target address will be the next sequential address after the address of the first branch instruction, i.e. the next sequential address after address Xn. Since the address Xn is captured directly within the entry, then that second target address is statically defined by the entry, and accordingly way prediction information can again be captured within the flags fields if desired.

This provides an ancillary benefit when using the two-taken entry. In particular, a single-taken entry provided for a return instruction will not typically be able to have any way prediction information associated with it, since the target address will be dynamic, and in particular will be obtained by reference to the return stack, and will depend upon the function call instruction that has called the function terminated by that return instruction. However, for the two-taken entry 250 shown in FIG. 4D, the return instruction is directly correlated with an associated call instruction, and hence the second target address is directly known. In particular, if a hit is detected based on such an entry 250, it is known that the second target address, i.e. the target address of the return instruction, will be the next sequential address after the address Xn, and accordingly way prediction information associated with that address can be captured within the entry 250, enabling potential power savings when accessing the BTB during the next prediction iteration using that target address to identify the next predict block.

Figure 5:
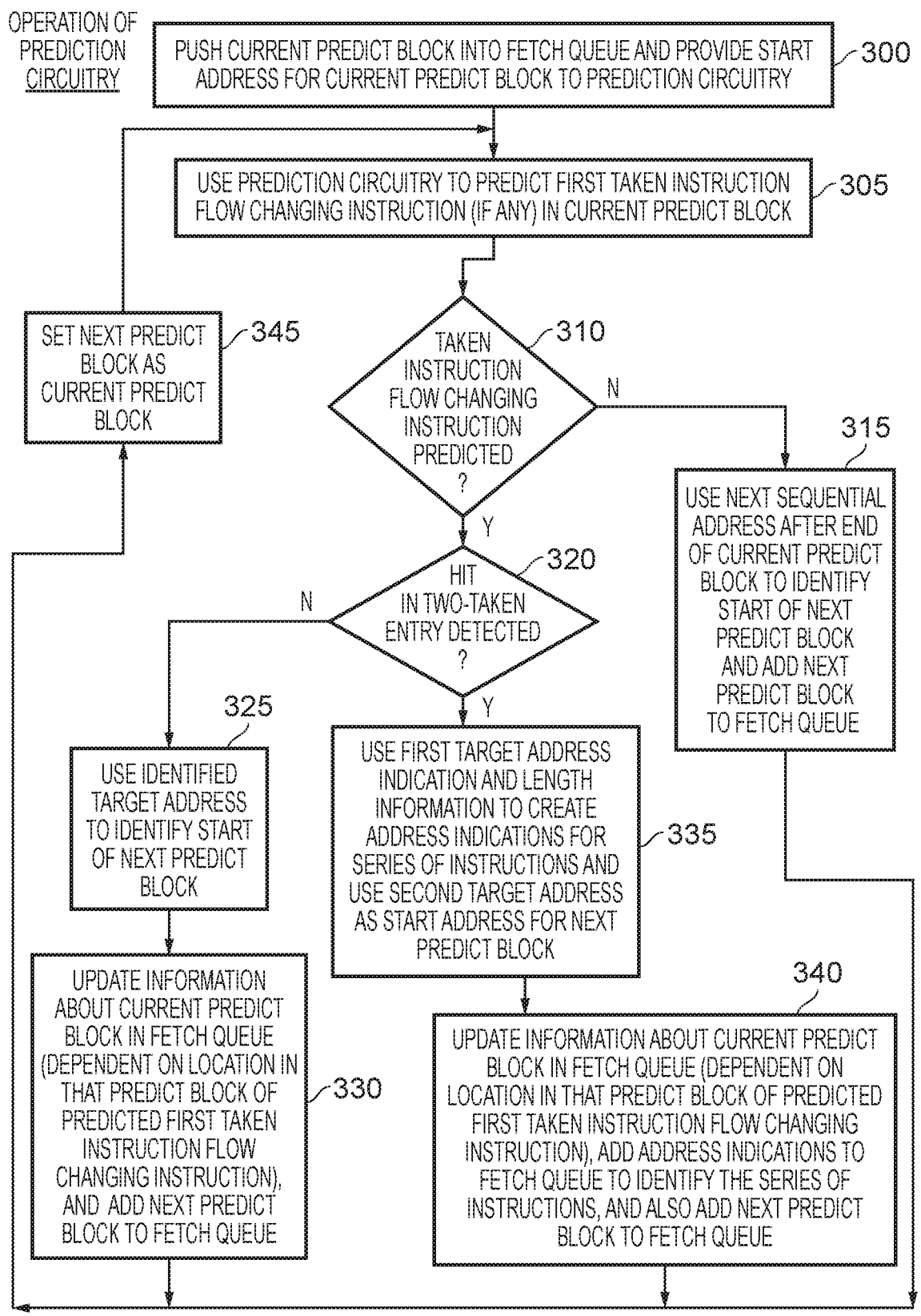
FIG. 5 illustrates the operation of the prediction circuitry of FIG. 1 in accordance with one example arrangement.

FIG. 5 is a flow diagram illustrating the operation of the branch predictor 10 of FIG. 1 (also referred to herein as the prediction circuitry). At step 300, the current predict block is pushed into the fetch queue 40 and the start address of that predict block is provided to the various prediction components 20, 25, 35.

Then, at step 305, the prediction circuitry is used to predict the first taken branch instruction (if any) within the current predict block. In particular, the outputs from the main and micro-BTBs 20, 25 will identify any instructions in the predict block that are predicted to be branch instructions, and provide an indication of the target address for such branch instructions if those branches are taken. For any of those branch instructions that are considered to be conditional branch instructions, the branch direction predictor 35 will provide a prediction as to whether those branch instructions will be taken or not. Based on this information, the prediction circuitry can predict the first taken branch instruction within the current predict block, if any.

At step 310, it is then determined whether a taken branch instruction was predicted or not. If not, the process proceeds to step 315 where the next sequential address after the end of the current predict block is used to identify a start of a next predict block, and the next predict block is then added to the fetch queue via the multiplexer 15. The process then proceeds to step 345 where the next predict block is set as the current predict block and the process then returns to step 305.

If at step 310 it is determined that a taken branch instruction was predicted, then it is determined at step 320 whether a hit was detected in a two-taken entry for that branch instruction (that branch instruction being the first branch instruction predicted as taken within the predict block). If not, then the process proceeds to step 325 where the identified target address from the single-taken entry that resulted in a hit is used to identify the start of the next predict block. At step 330, the information about the current predict block is updated in the fetch queue. In particular, some portion of that predict block may need to be removed from the fetch queue, dependent on the location in that predict block of the predicted first taken branch. The next predict block is then added to the fetch queue.

Thereafter, the process proceeds to step 345 where the next predict block is set as the current predict block, and then the process returns to step 305.

If at step 320 a hit was detected in a two-taken entry, then at step 335 the first target address indication and the length information is used to create address indications for the series of instructions (i.e. the series forming the predict block Y in the example of FIG. 2), and then the second target address information is used to identify the start address for the next predict block.

At step 340, the information about the current predict block is updated in the fetch queue, dependent on the location in that predict block of the predicted first taken branch instruction. In addition, address indications are added to the fetch queue to identify the series of instructions (i.e. the predict block Y) and also to identify the next subsequent predict block (i.e. predict block Z in the example of FIG. 2). As discussed earlier, no prediction needs to be made for the intermediate predict block Y, since it is expected that that predict block will exhibit static behaviour. Accordingly, no direction predictions need to be made in relation to that predict block, and it is expected that the instructions of that predict block will be executed and will result in an unconditional branch instruction being executed that branches to the target address at the start of the predict block Z. Hence, whilst both the predict blocks Y and Z are added in the same cycle to the fetch queue 40 at step 340, thereafter the process proceeds to step 345 where the next predict block (i.e. the predict block Z) is identified as the current predict block and the process then returns to step 305.

Hence, with reference to FIG. 2, following the prediction for the predict block X, the next prediction iteration will be in relation to the predict block Z, with the predict block Y being bypassed from a prediction perspective, but with the instructions forming that predict block Y being added into the fetch queue. Hence, this increases the effective throughput of the branch predictor 10, without any reduction in prediction accuracy, and hence increases overall system performance.

Figure 6:
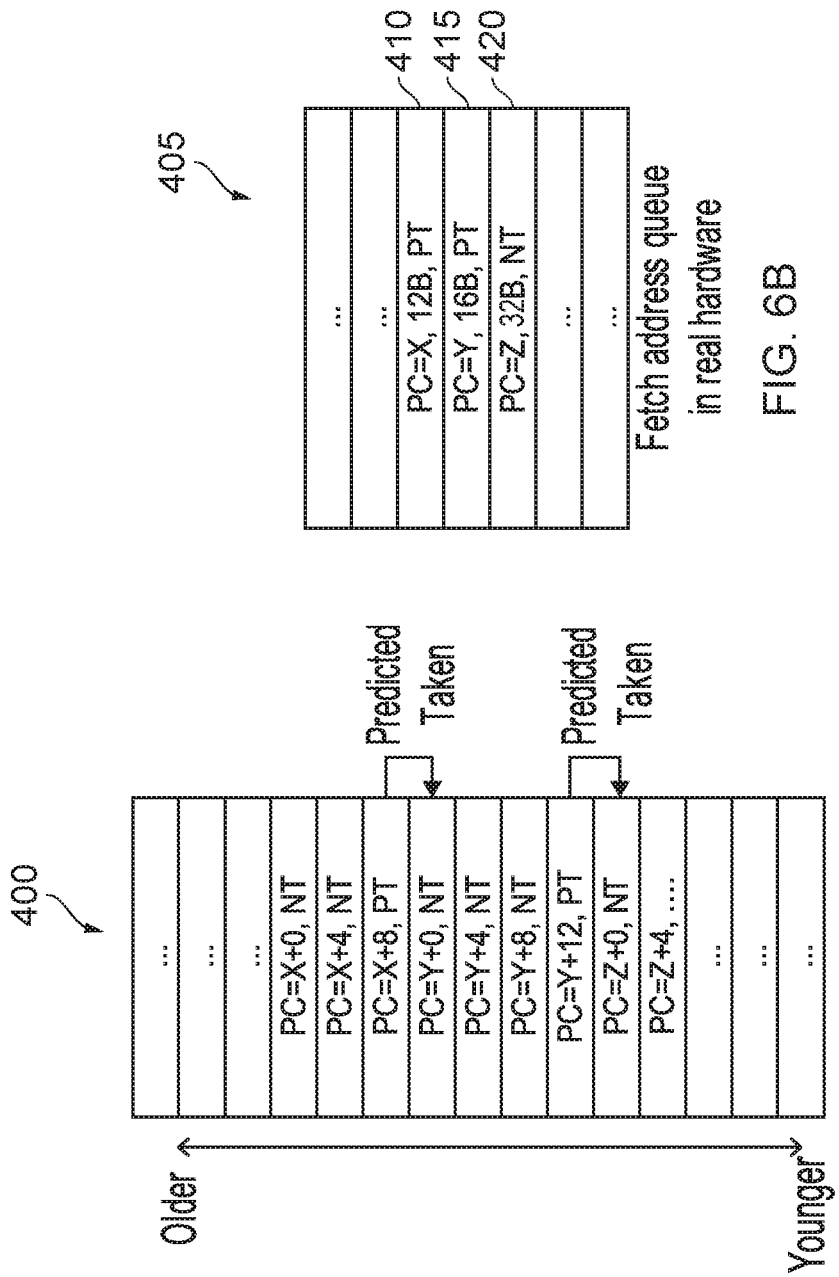
FIG. 6A schematically illustrates the sequence of instructions that may be identified within the fetch queue.
FIG. 6B illustrates how consecutively addressed instructions are identified within the same fetch queue entry in accordance with one example implementation.

FIG. 6A schematically illustrates how individual instructions can be identified within the fetch queue, in accordance with an arrangement 400. In this arrangement, each entry identifies one instruction. In the example shown, it is assumed that for the first predict block X, the first taken branch was detected on the third instruction in the predict block. Hence, whilst prior to the prediction being made for predict block X, all of the instructions in that predict block may have initially been added to the fetch queue, once the prediction has been made only the first three instructions in that predict block will be retained. Similarly, in the example illustrated in FIG. 6A, the first four instructions in the predict block Y are executed, with the fourth instruction being an unconditional branch instruction that terminates that intermediate block, and hence results in a branch to the predict block Z.

Whilst FIG. 6A conceptually indicates the information maintained within the fetch queue, in one example implementation the fetch queue is actually organised as shown in FIG. 6B, and in particular a single entry is provided for each predict block. Hence, in accordance with the organisation 405 of the fetch queue, a first entry 410 is provided for the predict block X, a second entry 415 is provided for the predict block Y and a third entry 420 is provided for the predict block Z. Whilst each of those entries may initially identify a 32 byte predict block, when branch instructions are identified that are predicted as taken the size information is shortened as appropriate, and a predicted taken indication is added to the entry. It will be appreciated that the arrangement 405 shown in FIG. 6B effectively captures the same information as that shown in the arrangement 400 of FIG. 6A.

Figure 7:
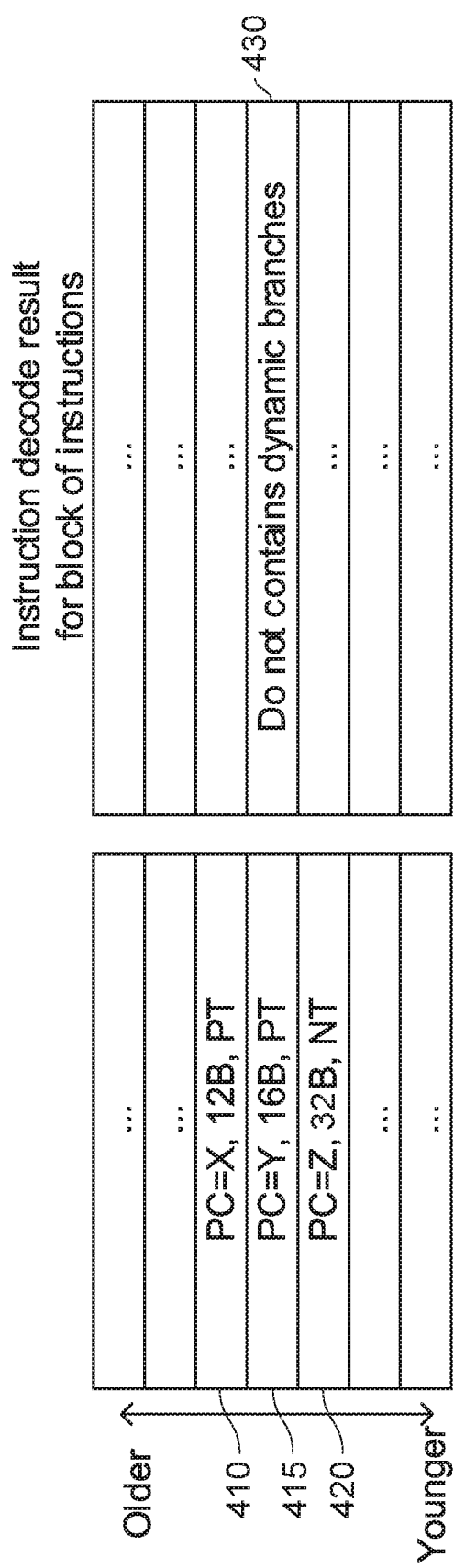
FIG. 7 illustrates how feedback information from the instruction decoder can be associated with particular entries within the fetch queue, in accordance with one example arrangement.

As mentioned earlier with reference to FIG. 1, the two-taken detection circuitry 60 associated with the main BTB 20 can monitor the contents of the fetch queue 40, in order to detect candidate sequences for the formation of a two-taken entry. Hence, with reference to FIG. 7, the sequence shown by the entries 410, 415, 420 identifies a candidate sequence for the creation of a two-taken entry. However, as will be apparent from the earlier discussion, certain criteria needs to be met in respect of the intermediate block Y in order for a two-taken entry to be created. In particular, it needs to be checked that that intermediate block contains instructions that exhibit static behaviour, and hence accordingly there are no dynamic branches within the intermediate block Y. This supplementary information can be provided by feedback information from the instruction decoder 55. In particular, once the block of instructions Y has been decoded, it will be known whether any of those instructions are branch instructions exhibiting dynamic behaviour, and hence the feedback information can be reviewed by the two-taken detection circuitry 60 in order to determine whether the two-taken condition is present or not.

With regard to the format of two-taken entry created, then as mentioned earlier this can identify type information for the first and second branches. In one implementation, that type information can be captured within the entries of the fetch queue, and hence for example it can be known whether the first instruction is conditional or not, whether the second instruction is a return instruction or not, whether the first instruction in that instance is an associated call instruction or not, etc, and then the two-taken entry can be populated accordingly. For example, as discussed earlier, when the second branch instruction is a return instruction, there is no need to directly capture the second target address within the two-taken entry.

Figure 8:
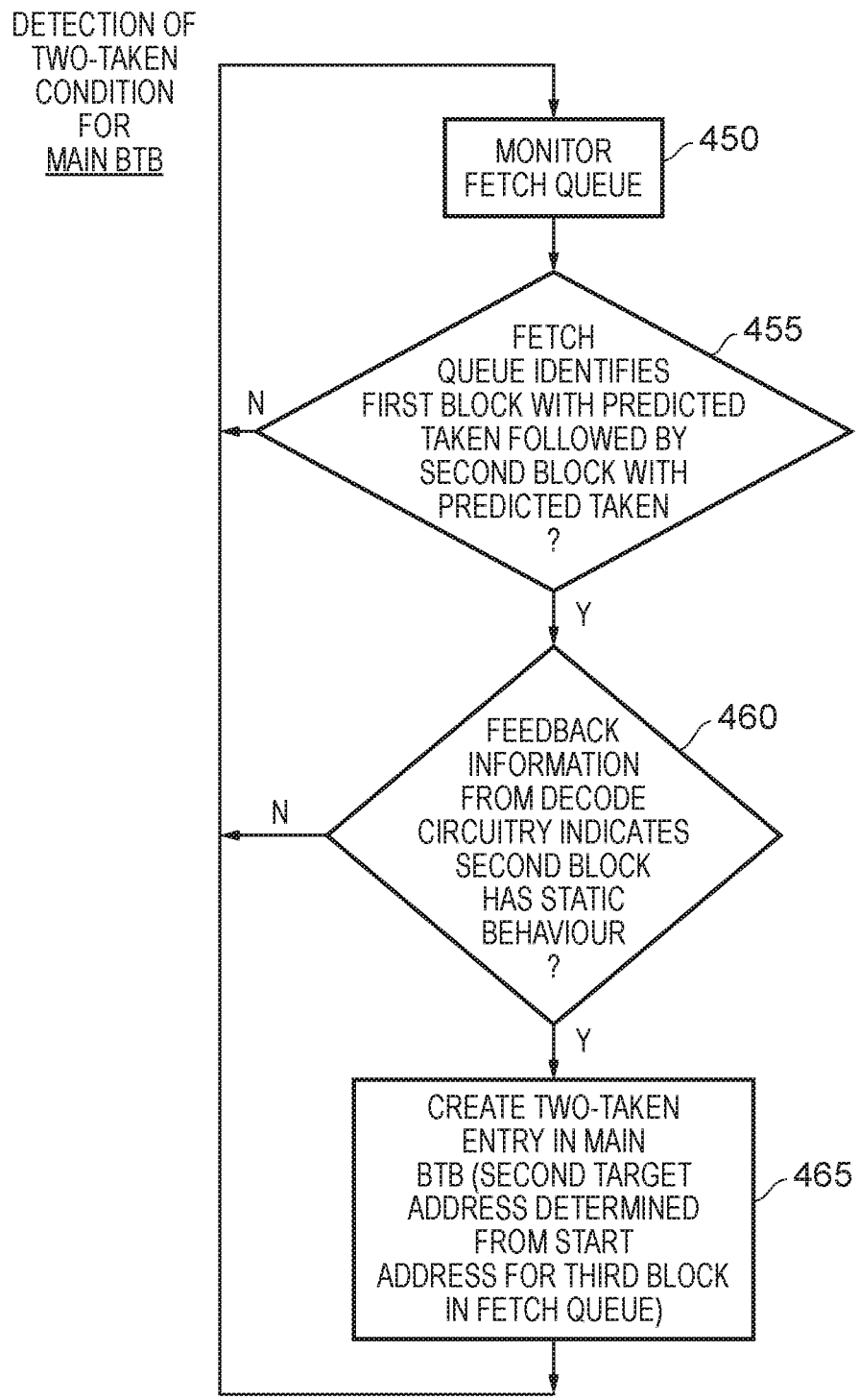
FIG. 8 is a flow diagram illustrating steps performed to detect the two-taken condition in association with the main branch target buffer of FIG. 1, in accordance with one example arrangement.

FIG. 8 is a flow diagram illustrating the process that may be performed by the two-taken detection circuitry 60 in order to detect the two-taken condition for the main BTB 20. At step 450, the fetch queue is monitored, and at step 455 it is determined whether the fetch queue contents identify a first block of instructions that terminates with a predicted taken branch, followed by a second block of instructions that terminates with a predicted taken branch. If not, then the current fetch queue contents do not indicate a candidate for a two-taken entry, but if that condition is met, then at step 460 it is determined whether feedback information from the decode circuitry indicates that the second block of instructions has static behaviour. As discussed earlier, this will for instance be the case if the only branch instruction in that second block is the instruction that terminates that block, and that terminating branch instruction is an unconditional direct branch instruction or an unconditional function return instruction.

If the condition at step 460 is not met, then again it is determined that the conditions have not been met for creating a two-taken entry, but if the condition at step 460 is met, then at step 465 a two-taken entry is created in the main BTB. In this event, the information required to populate the entry can be determined with reference to the information in the fetch queue for the predict blocks X and Y, and the start address for the predict block Z can be used to identify the second target address in situations where the second branch instruction is not a return instruction, and accordingly the format discussed earlier with reference to FIG. 4B is to be adopted for the two-taken entry.

FIG. 9 schematically illustrates the differences in format between a single taken entry 510 and a two-taken entry 520. The example two-taken entry shown in FIG. 9 assumes the general format shown in FIG. 4B, where both an indication of the first target address and the second target address need to be accommodated within the branch target field that is normally provided to store a single branch target address for a single taken entry. For clarity, the various flag fields discussed earlier with reference to FIG. 4B have been omitted, other than the valid field and the two-taken entry field. As mentioned earlier with reference to FIG. 4B, in order for such a generic type of two-taken entry to be formed, certain constraints may need to be enforced between the start addresses of the second and third predict blocks Y, Z, and the address of the first branch instruction (address X in the example of FIG. 9). In particular, a certain number of most significant bits of all three addresses may need to be the same, so that the upper bits of the addresses identifying the predict blocks Y and Z can be inferred from the corresponding bits identifying the source address X.

Figure 10A:
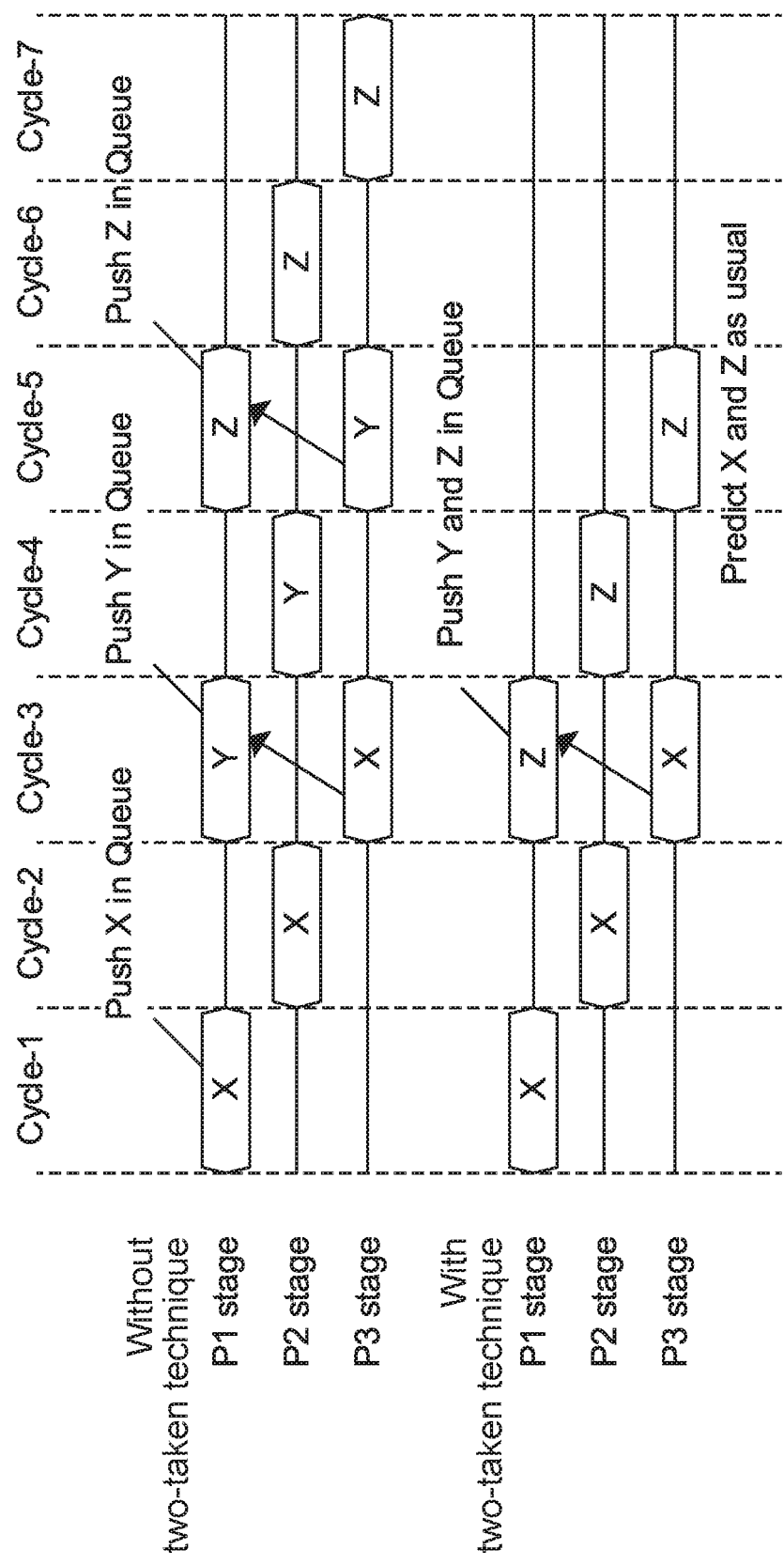
FIG. 10A is a timing diagram illustrating how the prediction bandwidth is improved when using two-taken entries, in accordance with one example implementation.

FIG. 10A is a timing diagram illustrating the performance improvement that can be realised when making predictions using a two-taken entry in the main BTB 20. The upper half of the figure shows the process when not using the two-taken technique. Hence, when the predict block X is passed through the branch predictor 10, then on the second cycle it is identified that the next predict block is predict block Y, it being assumed in this case that a hit is detected in a single taken entry that identifies, as the target address for the taken branch in predict block X, an address identifying the predict block Y. Accordingly, the predict block Y is pushed into the fetch queue in the third cycle, and then a prediction is made in respect of that predict block. In cycle 4, this results in the prediction of a target address identifying the predict block Z, and accordingly the predict block Z is pushed into the fetch queue in cycle 5, and prediction then proceeds in connection with that predict block.

In contrast, as shown in the lower half of the figure, if a hit is detected in a two-taken entry, then in the third cycle both the predict blocks Y and Z are pushed into the fetch queue, but the predict block Z is the next predict block identified to the branch predictor 10 for prediction purposes. Hence, predictions are made in respect of predict blocks X and Z as usual, but a prediction is bypassed for predict block Y, and instead the contents in the two-taken entry are used to identify that the predict block Y can be added to the fetch queue, but that no prediction is required in respect of that predict block.

Figure 10B:
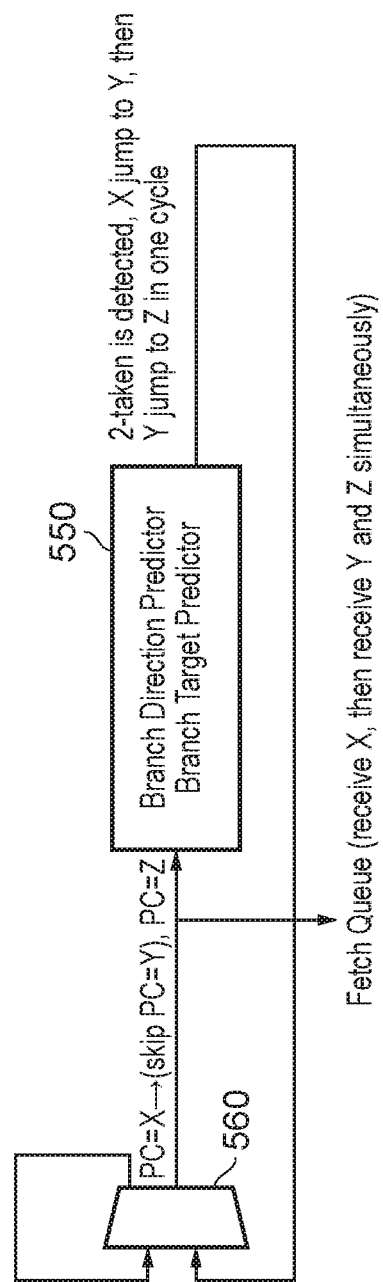
FIG. 10B schematically illustrates how prediction can be skipped for the predict block Y in the presence of a two-taken entry within the branch target predictor, in accordance with one example implementation.

The use of such a two-taken entry to speed up prediction is illustrated schematically in FIG. 10B. The multiplexer 560 corresponds to the multiplexer 15 shown in FIG. 1, and the prediction element 550 incorporates the various branch prediction components 20, 25, 30, 35 shown in FIG. 1. When the predict block X is pushed into the prediction element 550, a two-taken entry is detected, which identifies that the predict block X will transition to the predict block Y and then the predict block Y will transition to the predict block Z. This information is captured in one cycle, and both the predict blocks Y and Z can be added simultaneously to the fetch queue in the next cycle, but with the predict block Z being the next predict block provided via the multiplexer 560 to the prediction element 550.

FIGS. 11A and 11B illustrate two example patterns of instruction flow that incorporate a return instruction, and that can be captured using a two-taken entry. In accordance with FIG. 11A, a call instruction within the predict block X 570 causes a branch to be taken to the block Y 580. It is then assumed that a branch instruction B1 within that block causes a branch to some subsequent instruction, with the instruction flow then proceeding through to the return instruction that branches back into the predict block X 570. In particular, the return instruction will then branch back to the immediately following instruction after the original call instruction. In this instance, a two-taken entry of the form discussed earlier with reference to FIG. 4C can be populated within the BTB, where the first branch instruction is the branch instruction B1, and the second branch instruction is the return instruction.

FIG. 11B illustrates a similar pattern, but where there are no intervening branch instructions between the call instruction and the associated return instruction. Hence, in this case the call instruction within the predict block X 585 branches to a target address identifying the predict block Y 590, and the next branch instruction that occurs is the return instruction, causing a return to the instruction immediately following the associated call instruction. Such a pattern can be captured within a two-taken entry of the form discussed earlier with reference to FIG. 4D. As mentioned earlier, in addition to the branch prediction performance improvement that can be realised by creating a two-taken entry for such a pattern as shown in FIG. 11B, the use of a two-taken entry here also allows way prediction information to be captured in association with the target address for the return instruction. In particular, whereas in isolation the target address for the return instruction would not be static, since it would depend on which call instruction targeted the predict block Y, when a two-taken entry is used to capture information about both the return instruction and an associated call instruction, then the target address is directly identified, in that it is known that it will be the immediately subsequent instruction address following the instruction address of the specific call instruction that is also identified in the two-taken entry. Accordingly, way prediction information can be captured, which can allow power savings to be achieved when performing a subsequently lookup within the BTB using the target address for the return instruction.

As discussed earlier, two-taken entries can also be created within the micro-BTB 25. Due to the size of the micro-BTB 25, it can make predictions in one cycle. This is illustrated schematically in FIG. 12, which is a timing diagram illustrating the operation of the micro-BTB. In particular, when the predict block X is provided to the micro-BTB in a first cycle, then in the event of a hit in a single taken entry occurring within that first cycle, this can be used in the second cycle to push the predict block Y into the fetch queue, and for predict block Y to be input as the next predict block to the micro-BTB. When the predict block Y is then reviewed by the micro-BTB in cycle 2, a prediction may be made for the predict block Z. However, due to a pipeline bubble it may be that that information is not then provided to the fetch queue in cycle 3, and instead the predict block Z may be pushed into the fetch queue in cycle four. The information retained by the micro-BTB in the second stage is also pushed through to a third stage so that that information is retained for the length of time corresponding information is maintained by the main BTB 20.

Figure 12:
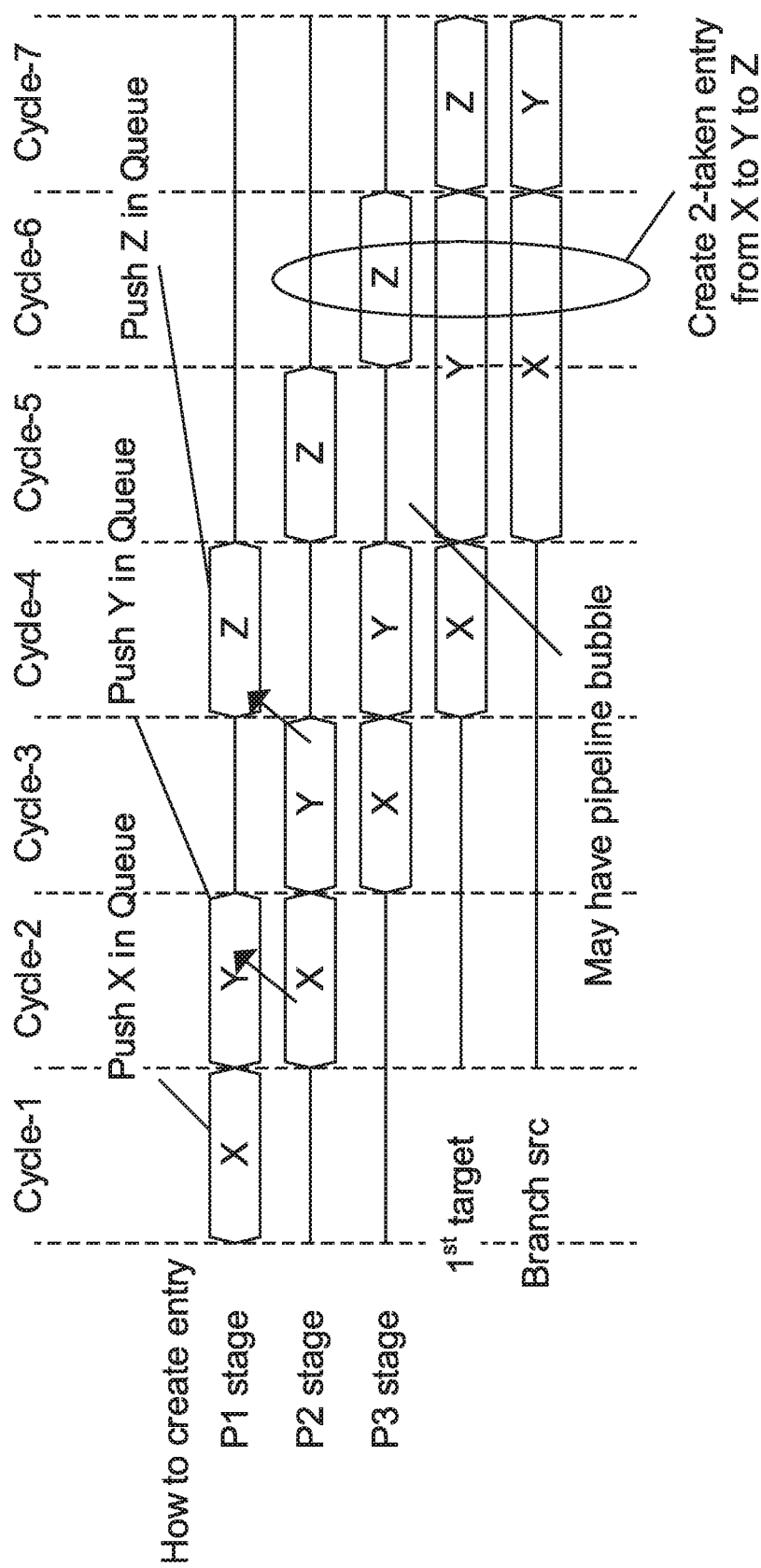
FIG. 12 is a timing diagram illustrating the operation of the micro branch target buffer of FIG. 1 in accordance with one example implementation, including the provision of additional pipeline stages to retain information that can be used to populate a two-taken entry within the micro branch target buffer.

However, as also shown in FIG. 12, some additional pipeline stages can be provided, referred to herein as the first target pipeline stage and the branch source pipeline stage, to enable information to be retained for a number of cycles after the micro-BTB prediction has been made, so that that information is still available to the micro-BTB if the two-taken detector 65 indicates that a two-taken entry can be created within the micro-BTB. In particular, in the example shown in FIG. 12, it will be seen that in cycle six the micro-BTB still has information about the predictions made for the predict blocks X, Y and Z, and hence if at that point the two-taken detector 65 indicates that a two-taken entry can be created, the micro-BTB can create a two-taken entry using the information residing in those three pipeline stages.

Figure 13:
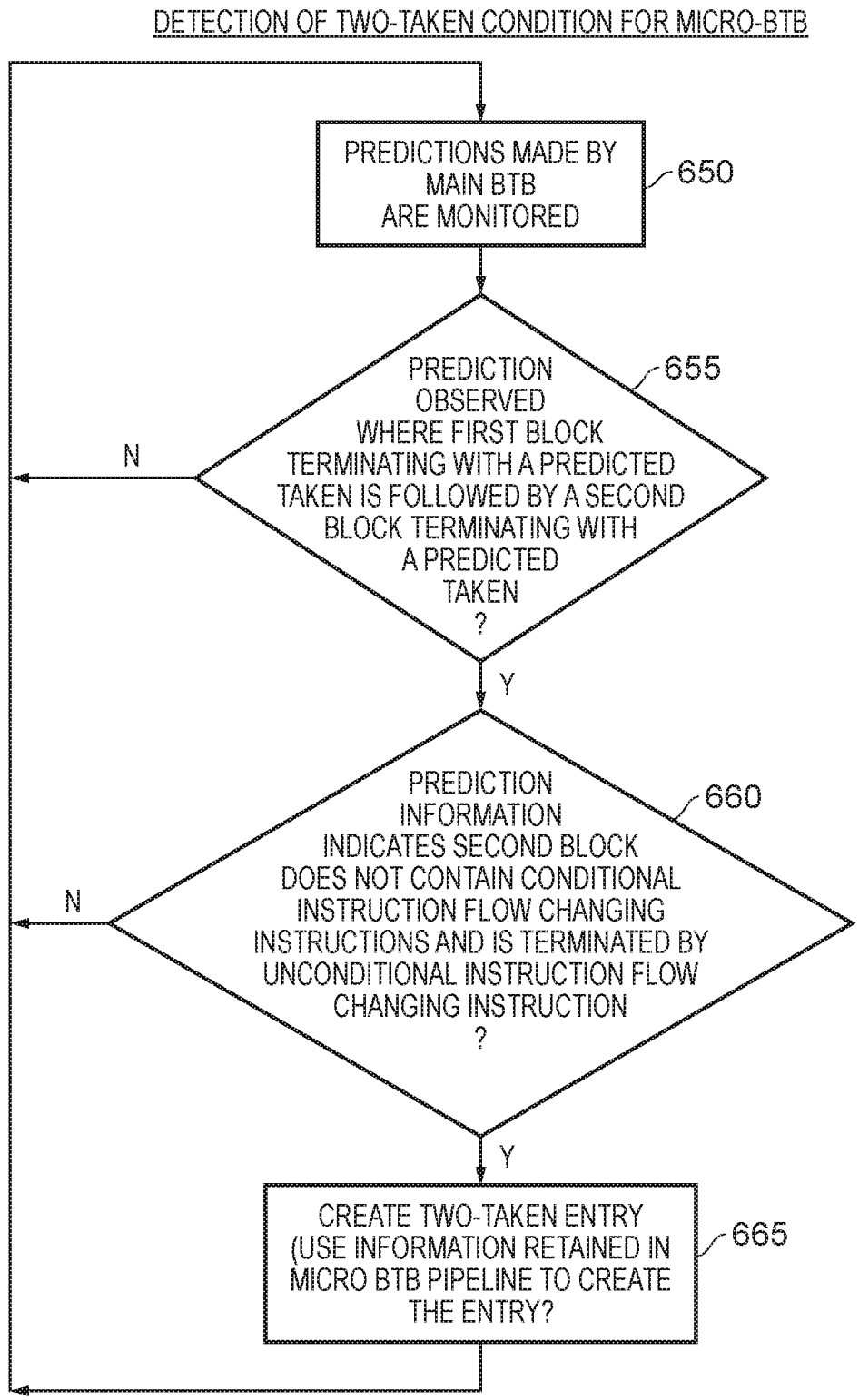
FIG. 13 is a flow diagram illustrating detection of the two-taken condition in association with the micro branch target buffer in accordance with one example implementation.

FIG. 13 is a flow diagram illustrating the detection of a two-taken condition for the micro-BTB 25 using the two-taken detector 65 of FIG. 1. At step 650 the predictions made by the main BTB are monitored. It is then determined at step 655 whether a prediction has been observed where a first block terminated within a predicted taken branch and was followed by a second block that also terminated with a predicted taken branch. If that condition is not met, then the two-taken condition is not present, and the process returns to step 650. However, if that condition is met at step 655, it is then determined at step 660 whether the prediction information indicates that the second block does not contain conditional instruction flow changing instructions and is terminated by an unconditional instruction flow changing instruction. To assist in this evaluation, the two-taken detector 65 can receive all of the prediction information that was evaluated by the prediction logic 30, and hence can be provided with sufficient information to know the type of the branch instructions that terminated each block.

If that condition is not met, then again the process returns to step 650, but if that condition is met the process proceeds to step 665 where a two-taken entry is created within the micro-BTB 25. As discussed earlier with reference to FIG. 12, the information required to create that entry will be present within the various BTB pipeline stages discussed earlier, in particular the pipeline stages labelled P3 stage, first target stage and branch source stage.

It should be noted that the process of FIG. 13 allows the micro-BTB 25 to create two-taken entries, even if a corresponding two-taken entry is not present within the main BTB 20. In addition, if a two-taken entry is present within the main BTB, it can be cached directly within the micro-BTB 25 in one example implementation. Hence, in one implementation the micro-BTB 25 may contain two-taken entries that it has created directly, based on a trigger from the two-taken detector 65, and two-taken entries which are merely cached versions of two-taken entries maintained by the main BTB.

Figure 14:
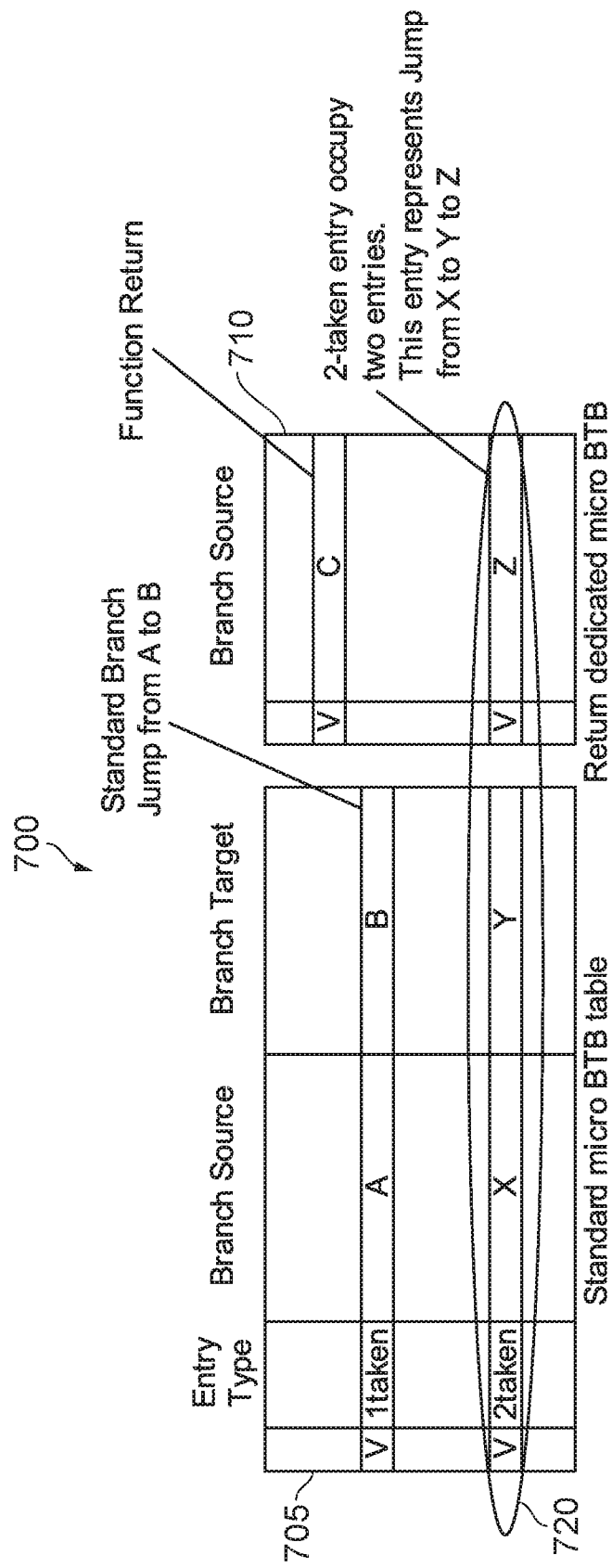
FIG. 14 illustrates how a two-taken entry can be provided within the micro branch target buffer in accordance with one example implementation.

FIG. 14 schematically illustrates a format for entries within the micro-BTB 25. In particular, the micro-BTB 25 may contain multiple banks, and hence the micro-BTB 700 may have a first bank 705 that is used to store information about branch instructions where the associated branch target needs to be directly captured, whilst a second bank 710 can be used to store information about branch instructions, where the branch target can be inferred from other branch prediction resources within the branch predictor 10. Hence, a standard one taken entry within the first bank 705 may identify the address A for a source branch instruction and then a target address B that is the target address of that branch instruction assuming that branch instruction is taken. However, where the source branch instruction is an instruction such as a function return instruction, and accordingly the return address can be directly determined from a return stack, then an entry within the second bank 710 can be used instead. Accordingly, the address C is assumed to be the address of a return instruction in this example.

Within such an arrangement, if a two-taken entry is formed, as indicated by the two-taken flag being set within an entry of the first bank 705, then a corresponding entry in the second bank 710 can be selectively enabled to store at least part of the target address information required for the two-taken entry. Accordingly, the two-taken entry can be represented collectively by the fields 720 shown in FIG. 14. It should be noted however that it is not always the case that a corresponding buddy entry in the second bank 10 needs to be allocated. For example, if a two-taken entry of the form discussed earlier with reference to FIGS. 4C or 4D is being created, where the second target address does not need to be directly captured, there may be no need to allocate a buddy entry within the second bank 710. Instead, the various flag information (which has been omitted from FIG. 14 for clarity but can include the fields discussed earlier with reference to FIGS. 4C and 4D) can be used to identify that the second branch instruction is a return instruction, and the second target address can be inferred accordingly.

However, if a more generic two-taken entry of the form discussed earlier with reference to FIG. 4B is to be created, then the second target address Z can be captured in the buddy entry within the second bank 710, whilst the other information is captured within the main entry within the first bank 705. When both an entry in the main bank 705 and a buddy entry in the second bank 710 are utilised to form the two-taken entry 720, then the flag fields available within both entries can be used to capture the various flag information. For example, if desired, the length information can in that instance be captured within the flag fields of the entry in the second bank 710. This can free up encoding space within the flag fields of the first bank's entry to capture other information. However, it will be appreciated that in instances where an entry in the second bank is not allocated, then all of the flag information will be captured within the entry of the first bank 705.

Figure 15:
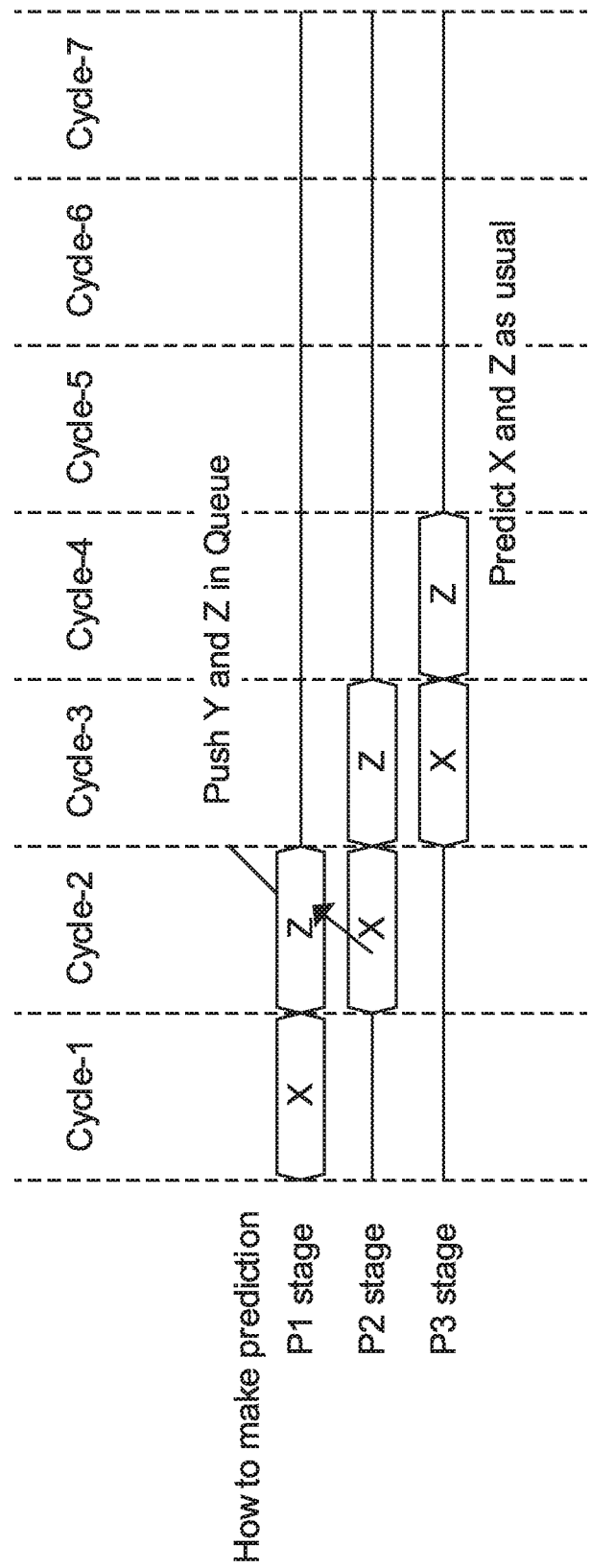
FIG. 15 is a timing diagram illustrating the prediction throughput improvement that may be realised when making predictions using two-taken entries within the micro branch target buffer in accordance with one example arrangement.

FIG. 15 is a timing diagram illustrating the performance improvements that can be realised when using a two-taken entry within the micro-BTB 25. In particular, if a hit is detected in a two-taken entry for the predict block X in the first cycle, then in the second cycle the predict block Z can be provided to the P1 stage as the next predict block, and in addition the predict blocks Y and Z can be added into the fetch queue 40. Hence, as shown in FIG. 15, predictions can be made as usual for the predict blocks X and Z, but no prediction is required for the predict block Y. This can significantly improve throughput without adversely affecting prediction accuracy.

In some instances, for example where self-modifying code (or cross-modifying code) is to be executed by the processing circuitry, it is possible that a branch may in due course be inserted within the intermediate predict block Y, hence making the use of a two-taken entry inappropriate. In this instance, it may be appropriate to demote a two-taken entry to a single taken entry. This is shown schematically in FIG. 16A, where at step 750 it is determined whether a trigger condition is detected. The trigger condition can take a variety of forms, but essentially is a condition where it is determined that the intermediate predict block Y is no longer expected to exhibit static behaviour. In the event of a trigger condition being detected, the process proceeds to step 755 where the corresponding two-taken entry is converted into a single taken entry. At this point, the two-taken flag is cleared, the source instruction address remains the same, i.e. identifying the first branch instruction, and the branch target information is adjusted to merely identify the first target address. No flags are then used to identify a branch type of a second branch instruction nor to identify a length of the block executed at the first target address. Further, no indication of a second target address is identified within the entry.

Figure 16A:
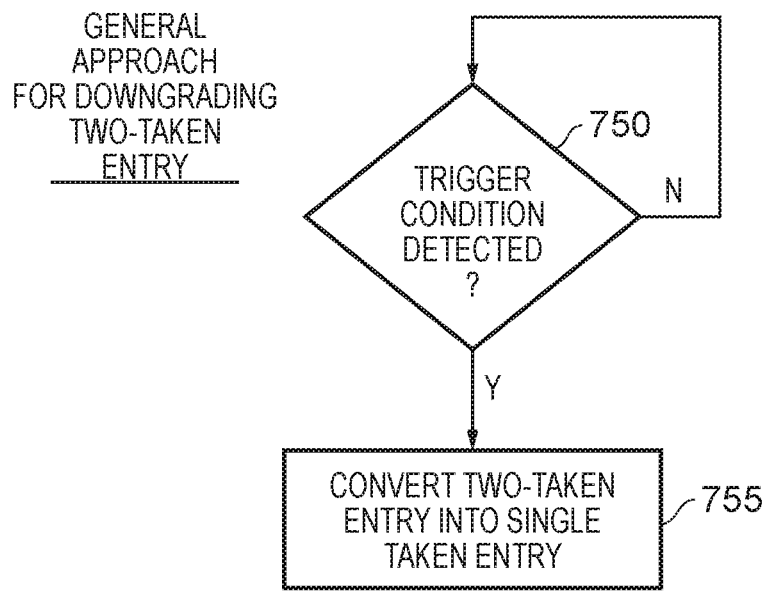
FIGS. 16A and 16B illustrate mechanisms that can be used for downgrading a two-taken entry to a single taken entry, in accordance with one example arrangement.
Figure 16B:
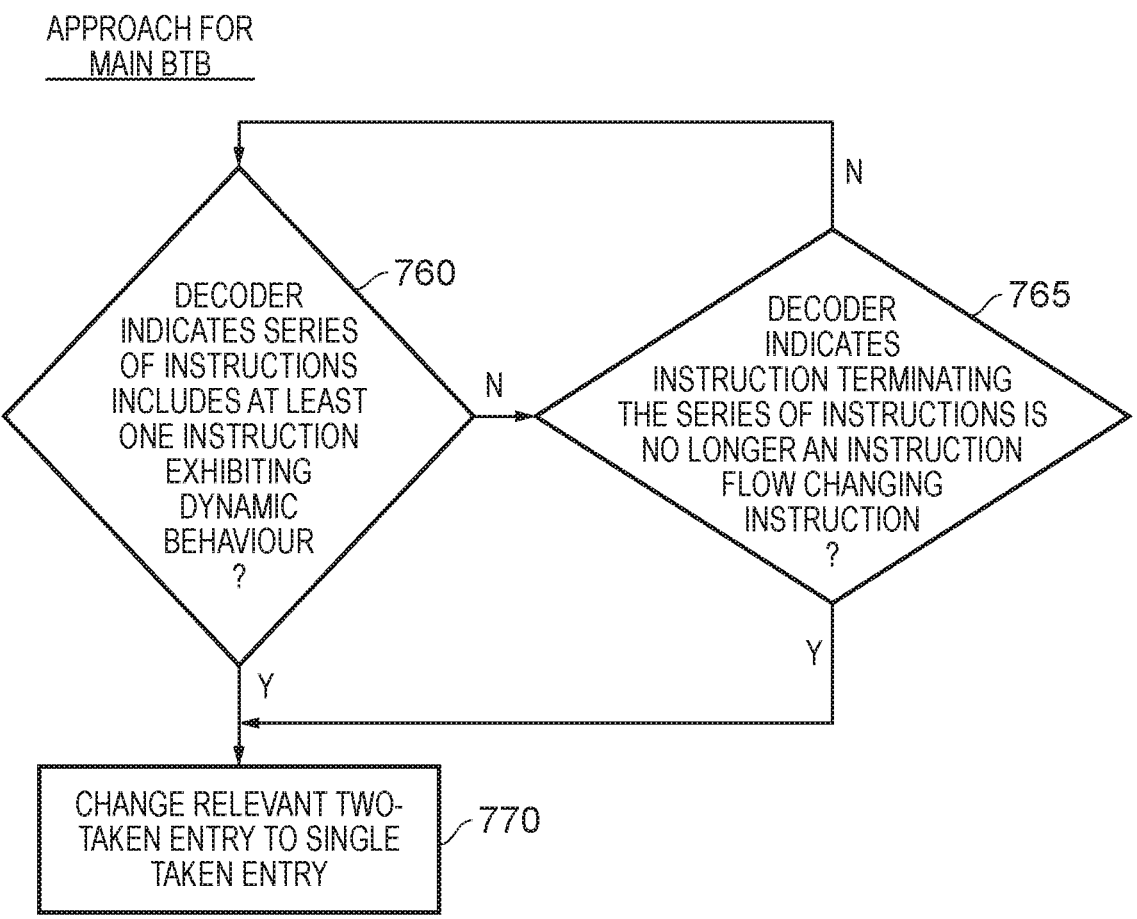

FIG. 16B illustrates a specific example of the approach of FIG. 16A that can be applied in respect of the main BTB. At step 760, feedback information from the instruction decoder 55 is used to identify whether the series of instructions forming the intermediate block Y includes at least one instruction that is exhibiting dynamic behaviour. To assist in the provision of this feedback information, when the contents of the fetch queue 40 are populated based on a two-taken entry, and accordingly the predict block Y is added based on a prediction using a two-taken entry, then a flag can be associated with that predict block to identify that a check needs to be performed by the instruction decoder for the instructions forming that predict block, and in particular feedback information needs to be provided to the two-taken detector 60 if any dynamic behaviour is identified in respect of those instructions.

If at step 760 the decoder identifies that the series of instructions includes at least one instruction exhibiting dynamic behaviour, then the process proceeds to step 770, where the two-taken detector 60 is notified, causing the corresponding two-taken entry in the main BTB 20 to be demoted to a single taken entry.

If at step 760 the decoder identifies that all of the instructions in the intermediate block Y are still exhibiting static behaviour, it is then checked at step 765 whether the instruction that terminates that series of instructions is still a branch instruction. If it is no longer a branch instruction, then again the process proceeds to step 770 where the relevant two-taken entry is demoted to a single taken entry.

With regard to adjustments made to entries in the micro-BTB 25, then the trigger for making such adjustments can be detected by the prediction logic 30 based on discrepancies between the output of the main BTB 20 and the micro-BTB 25. For example, if the main BTB produces an output from a single taken entry, but the micro-BTB produces an output from a two-taken entry, then it may be decided to demote the two-taken entry within the micro-BTB 25 to a single taken entry. Conversely, if the main BTB output indicates a prediction for a two-taken entry, but the corresponding output from the micro-BTB indicates a prediction for a one taken entry, then this may be used to cause the entry in the micro-BTB to be upgraded to a two-taken entry.

Figure 17:
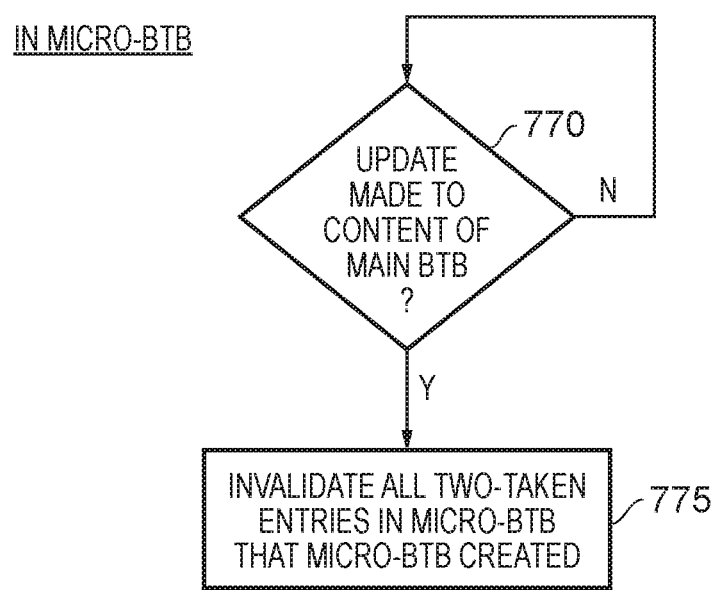
FIG. 17 is a flow diagram illustrating a situation where two-taken entries in the micro branch target buffer will be invalidated, in accordance with one example implementation.

In instances, where the micro-BTB is able to create its own two-taken entries, even in the absence of such two-taken entries in the main BTB 20, then in one example implementation such created two-taken entries are invalidated if any update to the main BTB 20 takes place, as illustrated by the process of FIG. 17. In particular, if at step 770 an update is made to the content of the main BTB, then at step 775 all two-taken entries in the micro-BTB that the micro-BTB has itself created are invalidated. In particular, it will typically not be easy to determine which two-taken entries created within the micro-BTB might have been affected by the update to the main BTB, and in particular to identify any entries which will have assumed static behaviour for the intermediate block Y, where that assumption is no longer reliable. Accordingly, the simplest option can be merely to invalidate such two-taken entries within the micro-BTB whenever there is an update to the main BTB. However, if a technique were to be provided to enable analysis of the individual micro-BTB entries to be made to assess whether they are still accurate or not despite the update to the main BTB, then it would be possible to only invalidate the affected entries.

When adopting the approach illustrated with reference to FIG. 17, it will be appreciated that the life time of two-taken entries in the micro-BTB may be significantly shorter than the life time of the two-taken entries in the main BTB.

It should be noted that the process performed with reference to FIG. 17 does not need to be performed with respect to any two-taken entries in the micro-BTB that are a direct cached copy of a corresponding entry in the main BTB. In particular, if following an update to the main BTB, a two-taken entry is still present in the main BTB, then the corresponding cached version of that two-taken entry in the micro-BTB can still be retained.

From the above described examples, it will be appreciated that the technique disclosed herein enables the branch predictor to have a higher bandwidth, since two-taken branches can be created from a single branch predictor lookup. Hence, multiple predict blocks can be added into the fetch queue in a single cycle, and predictions can be skipped for certain predict blocks. In addition to the performance benefit that can be realised by such an approach, another advantage is that an energy saving can be realised, since the number of branch predictor lookups can be reduced.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a fetch queue to identify a sequence of instructions to be fetched for execution by execution circuitry; and
prediction circuitry to make predictions in respect of instruction flow changing instructions, and to control which instructions are identified in the fetch queue in dependence on the predictions;
wherein:
the prediction circuitry includes a target prediction storage having a plurality of entries that are used to identify target addresses for instruction flow changing instructions that are predicted as taken;
the target prediction storage comprises at least one entry that is configurable as a multi-taken entry to indicate that a source instruction flow changing instruction identified by that entry is a first instruction flow changing instruction with an associated first target address that identifies a series of instructions that is expected to exhibit static behavior and that terminates with a second instruction flow changing instruction, where the second instruction flow changing instruction is unconditionally taken and has an associated second target address; and
the prediction circuitry is arranged, when making a prediction for a chosen instruction flow changing instruction that is identified by a multi-taken entry in the target prediction storage, to identify with reference to target address information stored in that multi-taken entry both the series of instructions and a target instruction at the second target address, to cause the series of instructions and the target instruction to be identified in the fetch queue, to bypass making predictions for said series of instructions, and to begin making further predictions starting from the target instruction at the second target address;
for an entry to be configured as a multi-taken entry, an offset constraint is required to be met between the addresses of the first instruction flow changing instruction, the second instruction flow changing instruction and the target instruction at the second target address; and
wherein the space available within an entry is the same irrespective of whether the entry forms a single-taken entry or a multi-taken entry.

2. An apparatus as claimed in claim 1, wherein the second instruction flow changing instruction is predicted to be the only instruction flow changing instruction in the series of instructions.

3. An apparatus as claimed in claim 2, wherein the series of instructions is formed of one or more instructions occupying sequential addresses in memory.

4. An apparatus as claimed in claim 1, wherein each multi-taken entry is configured to identify as the target address information at least the first target address and a length value used to identify the number of instructions in the series of instructions.

5. An apparatus as claimed in claim 4, wherein one or more multi-taken entries are configured to further identify as the target address information the second target address.

6. An apparatus as claimed in claim 1, wherein:
the prediction circuitry is arranged to process predict blocks, where each predict block comprises a plurality of instructions at sequential addresses in memory, and to output prediction information for each predict block; and
the offset constraint is specified with reference to a start address of the predict blocks containing the first instruction flow changing instruction, the second instruction flow changing instruction and the target instruction at the second target address.

7. An apparatus as claimed in claim 1, wherein each entry comprises a multi-taken flag which, when set, identifies that that entry is a multi-taken entry.

8. An apparatus as claimed in claim 1, wherein the second instruction flow changing instruction is one of:
(i) an unconditional direct branch instruction;
(ii) an unconditional function return instruction.

9. An apparatus as claimed in claim 8, wherein when the second instruction flow changing instruction identified by a multi-taken entry is the unconditional function return instruction, and the first instruction flow changing instruction is not an associated function call instruction, the prediction circuitry is arranged, when making a prediction using that multi-taken entry, to reference a return address prediction structure to determine the second target address.

10. An apparatus as claimed in claim 8, wherein within at least one multi-taken entry the first instruction flow changing instruction is a function call instruction and the second instruction flow changing instruction is an associated unconditional function return instruction.

11. An apparatus as claimed in claim 10, wherein:
the target prediction storage is a set associative storage comprising multiple ways; and
said at least one multi-taken entry includes way prediction information identifying whether any ways are to be disabled when accessing the target prediction storage using the second target address following a prediction made using that multi-taken entry.

12. An apparatus as claimed in claim 1, wherein:
the prediction circuitry further comprises direction prediction circuitry to determine whether a conditional instruction flow changing instruction is to be taken or not taken, and when the chosen instruction flow changing instruction is a conditional instruction the prediction circuitry is arranged to make the prediction using the multi-taken entry when the direction prediction circuitry predicts that the chosen instruction flow changing instruction will be taken.

13. An apparatus as claimed in claim 1, further comprising:
multi-taken condition detection circuitry to monitor the instructions in the fetch queue, and feedback information provided by decode circuitry used to decode the instructions fetched for execution by the execution circuitry, in order to detect a multi-taken condition where a multi-taken entry can be created for a source instruction flow changing instruction;
wherein the target prediction storage is arranged to allocate a multi-taken entry when notified by the multi-taken condition detection circuitry of the presence of the multi-taken condition.

14. An apparatus as claimed in claim 13, wherein the feedback information identifies when a series of decoded instructions exhibits static behavior.

15. An apparatus as claimed in claim 13, wherein the target prediction storage is arranged to determine from the fetch queue the information required to populate the allocated multi-taken entry.

16. An apparatus as claimed in claim 1, wherein the target prediction storage is a micro target prediction storage used to cache prediction information maintained by a main target prediction storage.

17. An apparatus as claimed in claim 16, further comprising:
multi-taken condition detection circuitry to monitor the predictions made by the main target prediction storage to detect a multi-taken condition when the main target prediction storage predicts that a series of instructions is expected to exhibit static behavior and terminates with an instruction flow changing instruction that is unconditionally taken; and
the micro target prediction storage is arranged to allocate a multi-taken entry in response to the multi-taken condition detection circuitry indicating presence of the multi-taken condition.

18. An apparatus as claimed in claim 17, wherein:
the micro target prediction storage is arranged to process predict blocks, where each predict block comprises a plurality of instructions at sequential addresses in memory, and to output prediction information for each predict block;
the micro target prediction storage has a plurality of pipelined stages, including at least two post-prediction pipelined stages for maintaining information about predict blocks for which a prediction has already been made by the micro target prediction circuitry; and
in the presence of the multi-taken condition the micro target prediction circuitry is arranged to determine the information required to populate the allocated multi-taken entry with reference to the information about predict blocks that is held in said at least two post-prediction pipelined stages.

19. An apparatus as claimed in claim 16, wherein when an update is made to the information stored in the main target prediction storage, the micro target prediction storage is arranged to invalidate any entry marked as a multi-taken entry.

20. An apparatus as claimed in claim 1, wherein the target prediction storage comprises a plurality of banks, and when an entry in a first bank is marked as a multi-taken entry, an associated entry in a second bank is selectively allocated to store at least a portion of the target address information for the multi-taken entry.

21. An apparatus as claimed in claim 20, wherein:
the multi-taken entry in the first bank is configured to identify the first instruction flow changing instruction, the associated first target address, and an indication of the number of instructions in the first series of instructions; and
the associated entry in the second bank is selectively allocated to identify the second target address associated with the second instruction flow changing instruction.

22. An apparatus as claimed in claim 1, wherein in response to a trigger condition the target prediction storage is configured to convert a multi-taken entry into a single taken entry which identifies the first instruction flow changing instruction and the associated first target address.

23. An apparatus as claimed in claim 22, wherein the trigger condition occurs when decode circuitry used to decode instructions fetched for execution by the execution circuitry determines that the series of instructions comprises at least one instruction that exhibits dynamic behavior.

24. An apparatus as claimed in claim 22, wherein the trigger condition occurs when decode circuitry used to decode instructions fetched for execution by the execution circuitry determines that the instruction terminating the series of instructions is no longer an instruction flow changing instruction.

25. An apparatus as claimed in claim 1, wherein:
the prediction circuitry is arranged to process predict blocks, where each predict block comprises M instructions at sequential addresses in memory, and to output prediction information for each predict block; and
the series of instructions identified in a multi-taken entry comprises up to M instructions.

26. An apparatus as claimed in claim 1, wherein the instructions in the fetch queue are identified by specifying address information for those instructions.

27. A method of making predictions for instruction flow changing instructions, comprising:
identifying within a fetch queue a sequence of instructions to be fetched for execution by execution circuitry;
making predictions in respect of instruction flow changing instructions, and controlling which instructions are identified in the fetch queue in dependence on the predictions;
identifying, within entries of target prediction storage, target addresses for instruction flow changing instructions that are predicted as taken;
configuring at least one entry in the target prediction storage as a multi-taken entry to indicate that a source instruction flow changing instruction identified by that entry is a first instruction flow changing instruction with an associated first target address that identifies a series of instructions that is expected to exhibit static behavior and that terminates with a second instruction flow changing instruction, where the second instruction flow changing instruction is unconditionally taken and has an associated second target address; and when making a prediction for a chosen instruction flow changing instruction that is identified by a multi-taken entry in the target prediction storage, identifying with reference to target address information stored in that multi-taken entry both the series of instructions and a target instruction at the second target address, causing the series of instructions and the target instruction to be identified in the fetch queue, bypassing making predictions for said series of instructions, and beginning making further predictions starting from the target instruction at the second target address, wherein for an entry to be configured as a multi-taken entry, an offset constraint is required to be met between the addresses of the first instruction flow changing instruction, the second instruction flow changing instruction and the target instruction at the second target address, and wherein the space available within an entry is the same irrespective of whether the entry forms a single-taken entry or a multi-taken entry.

\* \* \* \* \*